(12) United States Patent
Gimpel et al.

(10) Patent No.: US 7,024,834 B2
(45) Date of Patent: Apr. 11, 2006

(54) FRAMEWORK CONNECTION SYSTEM

(75) Inventors: Dixon S. Gimpel, Credit River, MN (US); Curtis H. Lindblom, Oakdale, MN (US)

(73) Assignee: Skyline Displays, Inc., Eagan, MN (US)

( * ) Notice: Subject to any disclaimer, the term of this patent is extended or adjusted under 35 U.S.C. 154(b) by 51 days.

(21) Appl. No.: 10/601,843

(22) Filed: Jun. 23, 2003

(65) Prior Publication Data

US 2004/0055244 A1     Mar. 25, 2004

Related U.S. Application Data

(60) Provisional application No. 60/390,489, filed on Jun. 21, 2002.

(51) Int. Cl.
*E04H 12/00* (2006.01)

(52) U.S. Cl. .................. 52/655.1; 52/81.3; 403/170

(58) Field of Classification Search ............... 52/633, 52/645, 646, 653.1, 653.2, 655.1; 403/169, 403/170, 217, 218, 219
See application file for complete search history.

(56) References Cited

U.S. PATENT DOCUMENTS

| | | | |
|---|---|---|---|
| 2,676,025 A | 4/1954 | Davis | |
| 3,483,998 A | 12/1969 | Butler | |
| 3,606,027 A | 9/1971 | Clements | |
| 3,787,134 A | 1/1974 | Burr | |
| 3,812,629 A | 5/1974 | Campbell | |
| 3,980,408 A | 9/1976 | Jachmann | |
| 4,150,907 A | 4/1979 | Thurnauer | |
| 4,212,445 A | 7/1980 | Hagen | |
| 4,345,849 A | 8/1982 | Stenemann | |
| 4,355,918 A | 10/1982 | Van Vliet | |
| 4,455,103 A | 6/1984 | Hackenberg | |
| 4,471,548 A | 9/1984 | Goudie | |
| 4,583,359 A | 4/1986 | Staeger | |
| 4,658,560 A | 4/1987 | Beaulieu | |
| 4,800,663 A | 1/1989 | Zeigler | |
| 4,815,885 A | 3/1989 | Wright | |
| 4,838,003 A * | 6/1989 | Zeigler | 52/646 |
| 4,864,795 A * | 9/1989 | Burg | 52/646 |

(Continued)

FOREIGN PATENT DOCUMENTS

CA     1048970     2/1979

(Continued)

OTHER PUBLICATIONS

Skyline Displays, Inc., *ps2000 brochure*, 2001.

(Continued)

*Primary Examiner*—Ramón O. Ramirez
*Assistant Examiner*—Steven Marsh
(74) *Attorney, Agent, or Firm*—Patterson, Thuente, Skaar & Christensen, P.A.

(57) ABSTRACT

A display framework connection system comprising a plurality of frame members, preferably tubular, a plurality of end flanges, and a hub system. The hub system can comprise a hub plate assembly and/or a hub casting assembly. In addition, at least one clamp assembly, preferably cylindrical, can be included for circumferential attachment to the outer surface of the frame members to provide for selective removable fastening of various attachments and accessories at positions along the length of the frame members. The hub plate assembly and the hug casting assembly can be connected individually to the frame members, or in combination, to enable selective angular configuration of the frame members to construct a frame construction, such as those commonly utilized in display frame systems.

45 Claims, 27 Drawing Sheets

U.S. PATENT DOCUMENTS

| | | | |
|---|---|---|---|
| 4,934,858 A | 6/1990 | Beaulieu | |
| 4,951,440 A | 8/1990 | Staeger | |
| 4,986,038 A | 1/1991 | Backer | |
| 5,024,037 A * | 6/1991 | Ono | 52/646 |
| 5,038,529 A | 8/1991 | Conley et al. | |
| 5,092,385 A | 3/1992 | Beaulieu | |
| 5,101,607 A | 4/1992 | Staeger | |
| 5,111,631 A | 5/1992 | Flood et al. | |
| 5,115,623 A | 5/1992 | Ahlberg | |
| 5,253,407 A | 10/1993 | Jamrus | |
| 5,269,112 A | 12/1993 | Weinrub et al. | |
| 5,271,685 A | 12/1993 | Stark | |
| 5,277,512 A | 1/1994 | Dwillies | |
| 5,351,843 A | 10/1994 | Wichman et al. | |
| 5,370,249 A | 12/1994 | Harvey et al. | |
| 5,501,051 A | 3/1996 | Harlan | |
| 5,536,097 A | 7/1996 | Hazan | |
| 5,537,766 A | 7/1996 | Nickens et al. | |
| 5,549,408 A | 8/1996 | Lo | |
| D373,692 S | 9/1996 | Staeger | |
| 5,561,960 A | 10/1996 | Minnick et al. | |
| 5,651,630 A | 7/1997 | Nomura | |
| 5,706,622 A | 1/1998 | Lange | |
| 5,769,247 A | 6/1998 | Merl | |
| 5,797,695 A * | 8/1998 | Prusmack | 403/170 |
| D408,560 S | 4/1999 | Bruder | |
| 5,957,614 A | 9/1999 | Aurich | |
| D417,292 S | 11/1999 | Staeger | |
| 6,079,178 A | 6/2000 | Fisher | |
| 6,149,021 A | 11/2000 | Beaulieu | |
| 6,186,134 B1 | 2/2001 | Battersby et al. | |
| 6,196,568 B1 * | 3/2001 | Stevens | 280/304.1 |
| 6,205,739 B1 * | 3/2001 | Newlin | 52/655.1 |
| 6,216,887 B1 | 4/2001 | Soo | |
| 6,273,633 B1 | 8/2001 | Husson et al. | |
| 6,405,884 B1 | 6/2002 | Dion | |
| 6,615,562 B1 | 9/2003 | Fritsche et al. | |
| 6,675,546 B1 * | 1/2004 | Coles | 52/655.1 |
| 6,854,238 B1 * | 2/2005 | Boots | 52/655.1 |
| 2001/0050262 A1 | 12/2001 | LaBruna, Jr. et al. | |

FOREIGN PATENT DOCUMENTS

| | | |
|---|---|---|
| DE | 9017415.1 | 12/1990 |
| DE | 296 19 015 U 1 | 2/1997 |
| DE | 298 21 204 U 1 | 4/1999 |
| DE | 203 09 076 U 1 | 9/2003 |
| EP | 1 164 230 A1 | 12/2001 |
| WO | WO 89/06724 | 7/1989 |

OTHER PUBLICATIONS

Skyline Displays, Inc., *imagine that. brochure*, 2000.
Skyline Displays, Inc., *design ideas brochure*, 2000.
Skyline Displays, Inc., *How Do You Market Your e-Business Offline? brochure*, 2001.
Skyline Displays, Inc., *mirage plus brochure*, 2001.
Skyline Displays, Inc., *skytruss brochure*, 2001.
Trussworks, Truss Catalog web page printout, *Truss Parts*, Aug. 17, 2001.
Trussworks, Truss Catalog web page printout, *Trussworks Photos, Graphics Frame*, p. 1, 2, 12, Aug. 17, 2001.
Trussworks, Truss Catalog web page printout, *Trussworks Photos, Exhibit Photos*, p. 1, Aug. 17, 2001.
Xtensis, *The Exhibit System You've Been Waiting For!*, Xtensis brochure, Canfield Industries, Inc., 20 pages.
INdoor, *Präsentationssysteme*, FRIstem, 14 pages.
Catalog, *Your Handrail Source*, Hollaender, 50 pages.

* cited by examiner

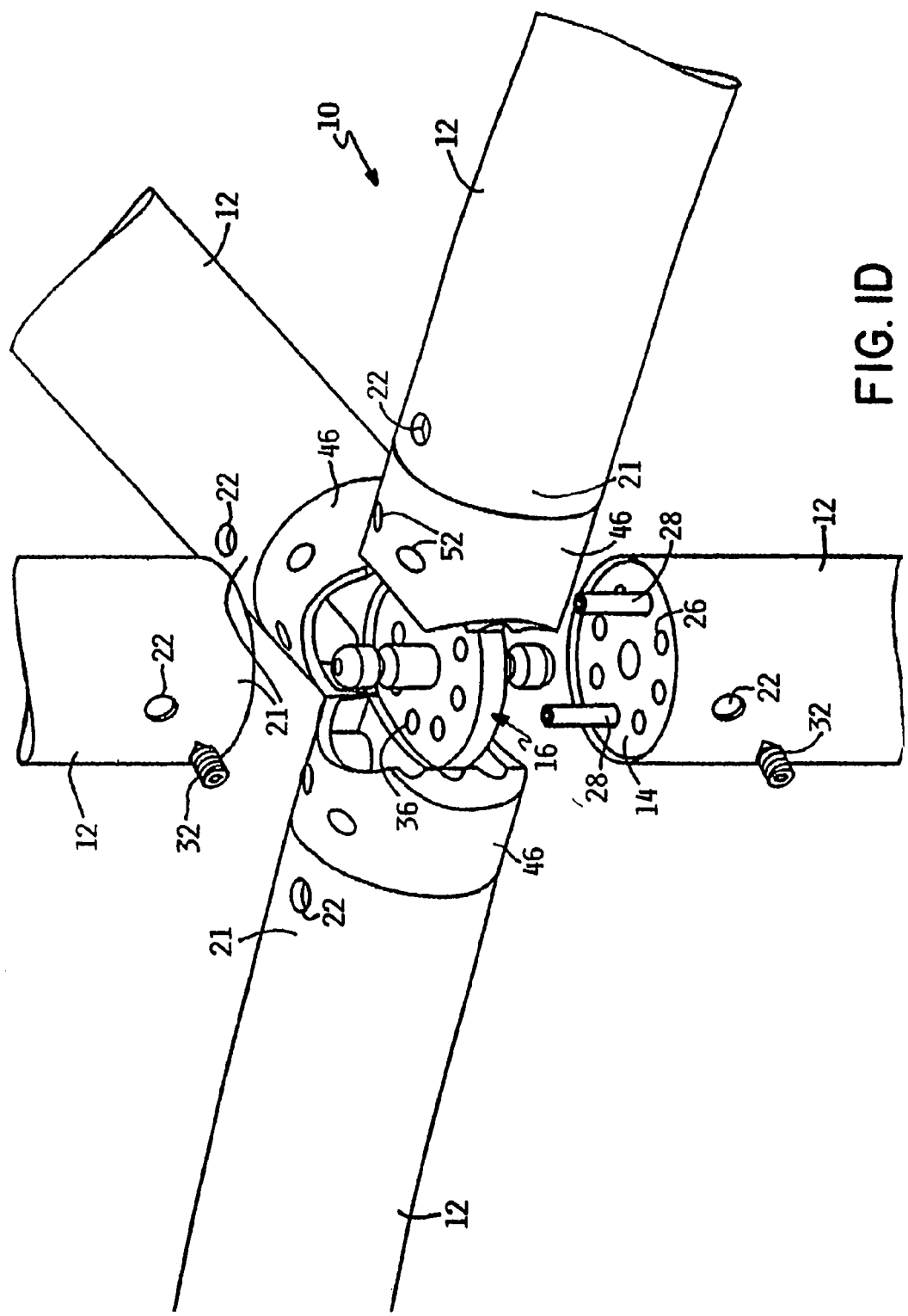
FIG. ID

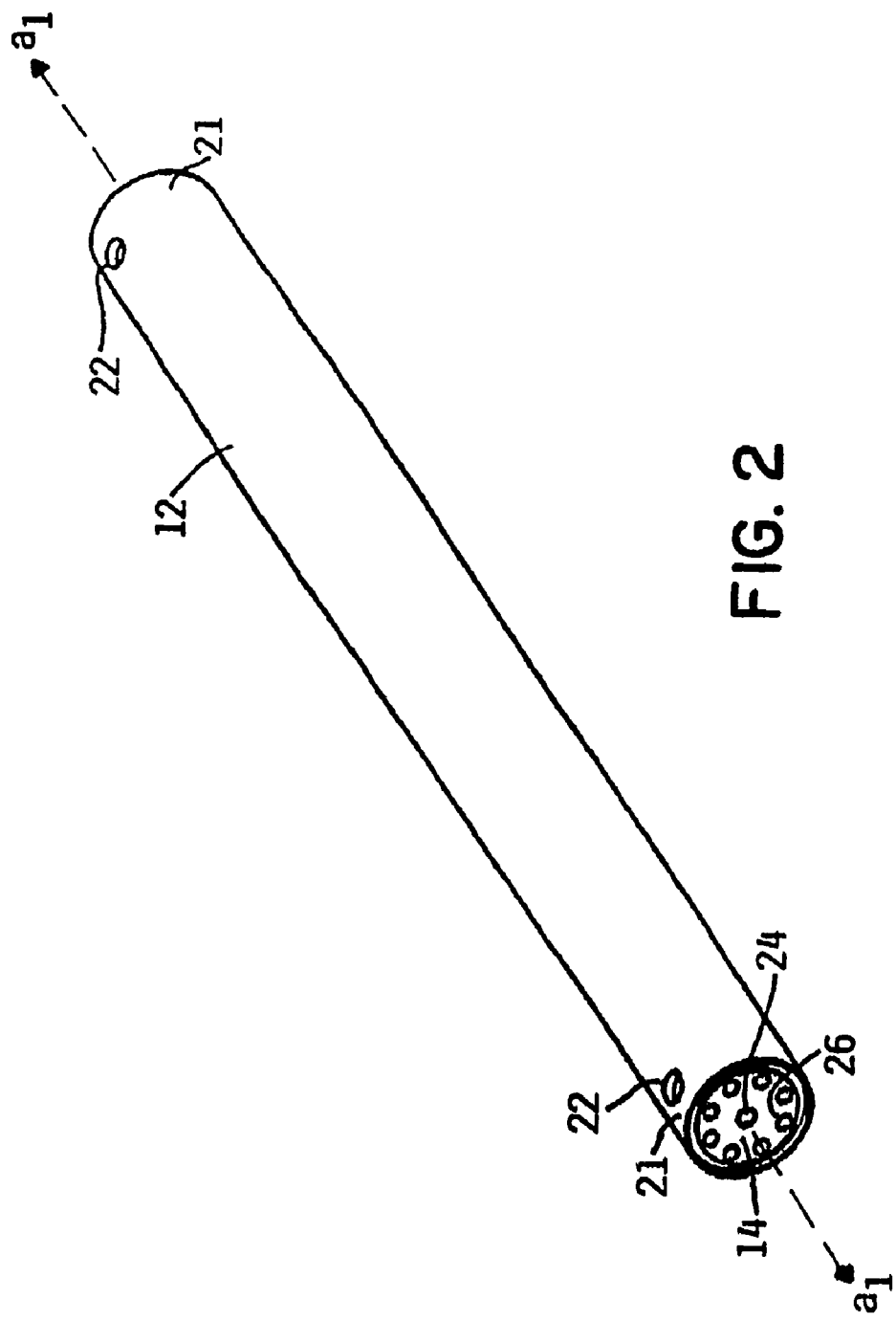

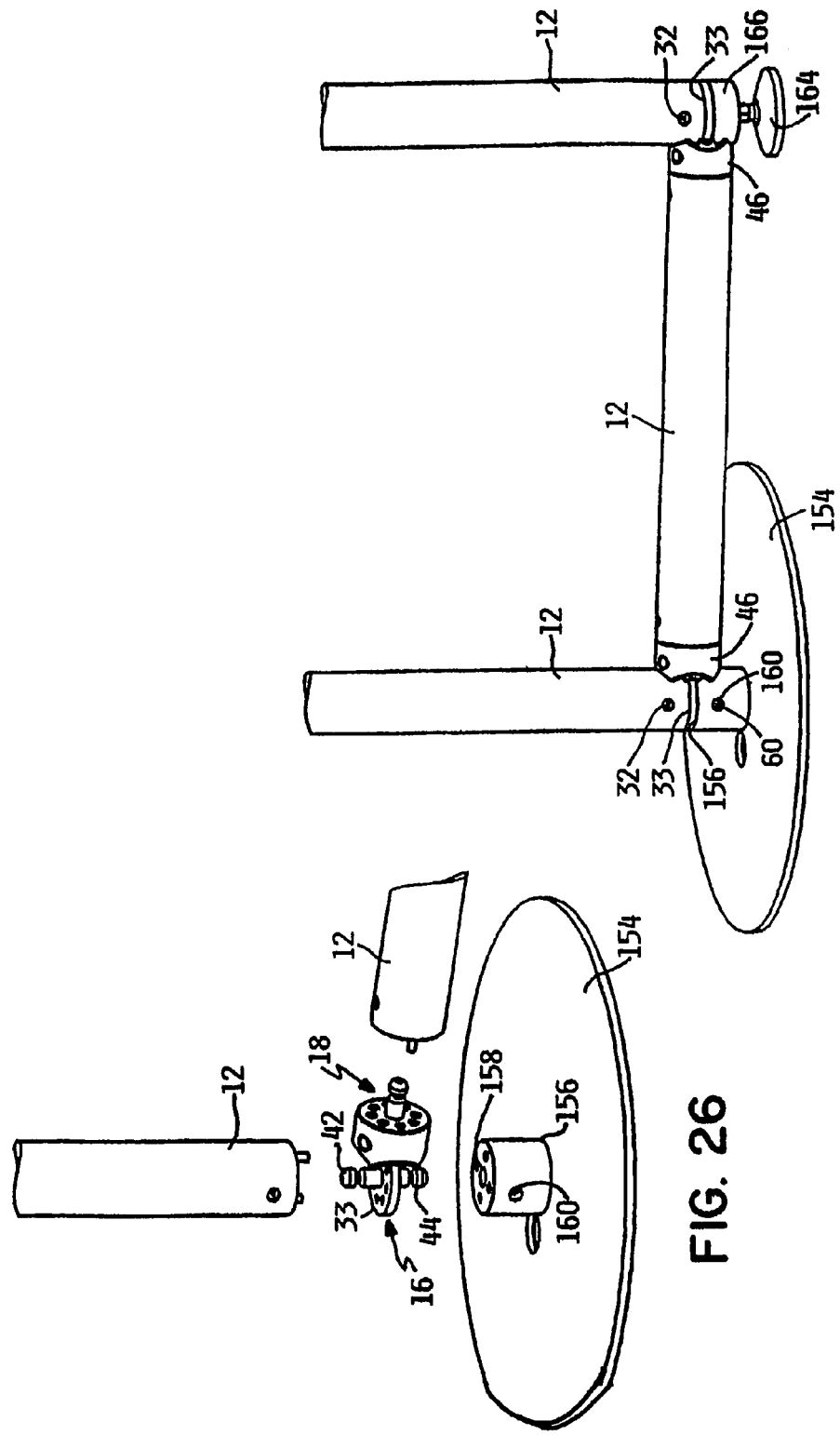

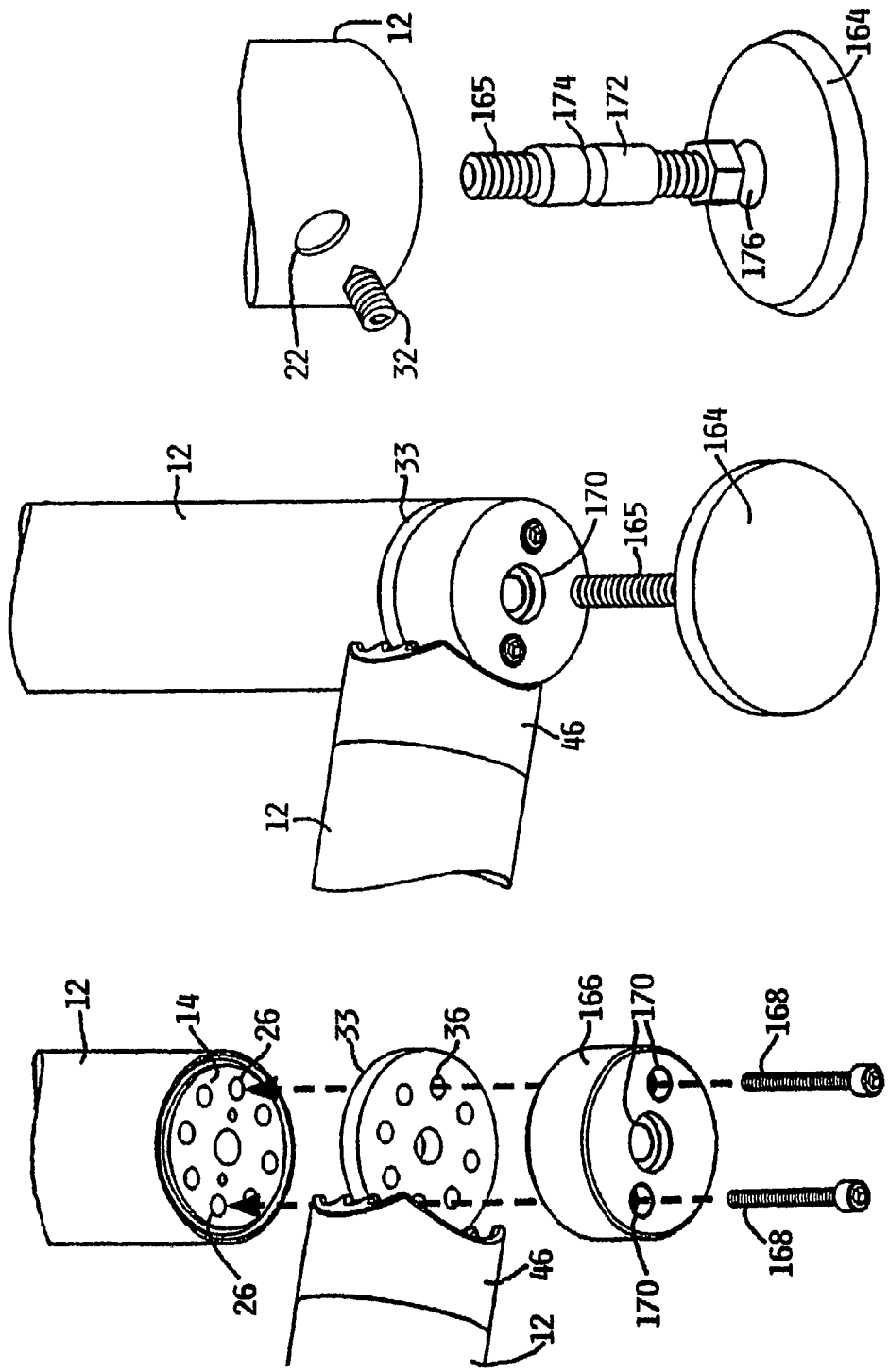

FRAMEWORK CONNECTION SYSTEM

RELATED APPLICATIONS

The present invention claims the benefit of U.S. Provisional Application No. 60/390,489 filed Jun. 21, 2002 and entitled "Framework Connection System," which is hereby incorporated by reference in its entirety.

FIELD OF THE INVENTION

The present invention is related generally to displays having support framework and graphical displays for use as exhibits at trade shows and the like. More particularly, the invention relates to such displays that are dissassemblable and that utilize tubular components to selectively vary the frame configuration.

BACKGROUND OF THE INVENTION

Exhibits for tradeshows and other marketing venues utilize eye catching and informative graphical portions that are intended to inform and present an image to customers or potential customers. A common use will be at convention or exposition halls where perhaps a single day is allocated for each of setup and removal. To create desired attention-getting appeal, such displays can be massive in size and complexity. Moreover such convention space is usually extraordinarily expensive as is labor for set up and take down of the displays. Thus, such displays need to be designed to be easily and quickly erected and taken down. Such constraints often make these displays quite expensive. Moreover, often new fresh designs are desirable.

Thus it is preferable that the displays are easily reconfigureable allowing at least the structural framework components to be reused in alternate display configurations.

The above needs have been met to some extent with collapsible frameworks or collapsible trusses, as illustrated with U.S. Pat. No. 6,149,021, and with box frame designs, as illustrated with U.S. patent application Ser. Nos. 09/953,111 and 09/953,113. While all of these systems have their advantages, the collapsible systems cannot support extensive weight and the exposed truss systems present an industrial look. Large diameter tubular framework systems present a very desirable visual alternative. Such systems have been used in trade show type displays but have not had the flexibility and reconfigurability desirable in this type of product line. Generally such large diameter tubular displays must be custom made for a particular design and involve welded connections and very large sections. Currently, such large framework systems are cumbersome and are often designed with one particular configuration in mind. If the members are not welded, they are generally joined using limited fixed joint connections. Predefined and fixed tees, cross bars, elbows, and the like are provided to join members in a particular configuration. An inability to selectively design and setup such steel tubular framework systems is problematic. It would be highly desirable to have a large diameter display utilizing large diameter tubing that is easily reconfigurable and dissassemblable. It would also be desirable to be able to incorporate such large diameter tubing framework systems with existing truss or box frame systems.

SUMMARY OF THE INVENTION

The display of the present invention addresses and solves many of the described problems that innately plague conventional displays. The present invention employs various individual components that are easily interconnectable to provide the end user with a myriad of framework configuration options utilizing large diameter tubing. These components can be selectively connected so that only those components are used that provide the user with the optimal configuration. As such, connectivity options are increased with the selective combination of only those components which are needed to meet the user's needs. In addition, the relatively simplistic design of the components and locking options of the present invention improves ease of assembly, disassembly, and reconfiguration.

The framework connection system of the present invention generally comprises a plurality of frame members, preferably tubular, a plurality of end flanges, and a hub system. The hub system can comprise a hub plate assembly and/or a hub casting assembly. In addition, at least one clamp assembly, preferably cylindrical, can be included for circumferential attachment to the outer surface of the frame members to provide for selective removable fastening of various attachments and accessories at positions along the length of the frame members. The hub plate assembly and the hug casting assembly can be connected individually to the frame members, or in combination, to enable selective angular configuration of the frame members to construct a frame construction, such as those commonly utilized in display frame systems.

An objective and feature of the present invention is the selective use and re-use of common component, such as hub plate and hub assemblies, to provide for variable frame connection configurations. Displays ranging from the simple to the complex are achieved using the same common mateable components.

Another objective and feature of the present invention is the ability to selectively and modularly connect metallic tubing members, linear and curvilinear, to construct simple and complex frame connection configurations.

Yet another objective and feature of the present invention is a display constructed of a tubular framework having clean and substantially uninterrupted visual lines, thus avoiding the conventional implementation of cumbersome, bulky, and unappealing hub designs. The present invention provides for substantial circumferential continuity or visual consistency between the frame member and the connected hub assembly.

Still another objective and feature of embodiments of the present invention is a display constructed of strong and durable steel tubular frame members to allow for increased stability and strength while still permitting selective modular configuration.

Another objective and feature of embodiment of the present invention is that the various securing members, such as the set screws, provide engagement with the pins of the mating components to correspondingly bring the components into abuttable or confrontable alignment.

BRIEF DESCRIPTION OF THE DRAWINGS

FIG. 1d is a perspective view of the connectivity of various components of a framework connection system in accordance with an embodiment of the present invention.

FIG. 2 is a perspective view of a linear tubular frame member in accordance with an embodiment of the present invention.

FIG. 26 is a perspective view of the connectivity of a base stand and tubular frame members in accordance with an embodiment of the present invention.

FIG. 27 is a perspective view of a base stand, base pod, and tubular frame members in accordance with an embodiment of the present invention.

FIG. 28 is a perspective view of the connectivity of a base pod and tubular frame members in accordance with an embodiment of the present invention.

FIG. 29 is a perspective view of the connectivity of a base pod and tubular frame members in accordance with an embodiment of the present invention.

FIG. 30 is a perspective view of the connectivity of a base pod and tubular frame member in accordance with an embodiment of the present invention.

DETAILED DESCRIPTION OF PREFERRED EMBODIMENTS

Figure 1A:
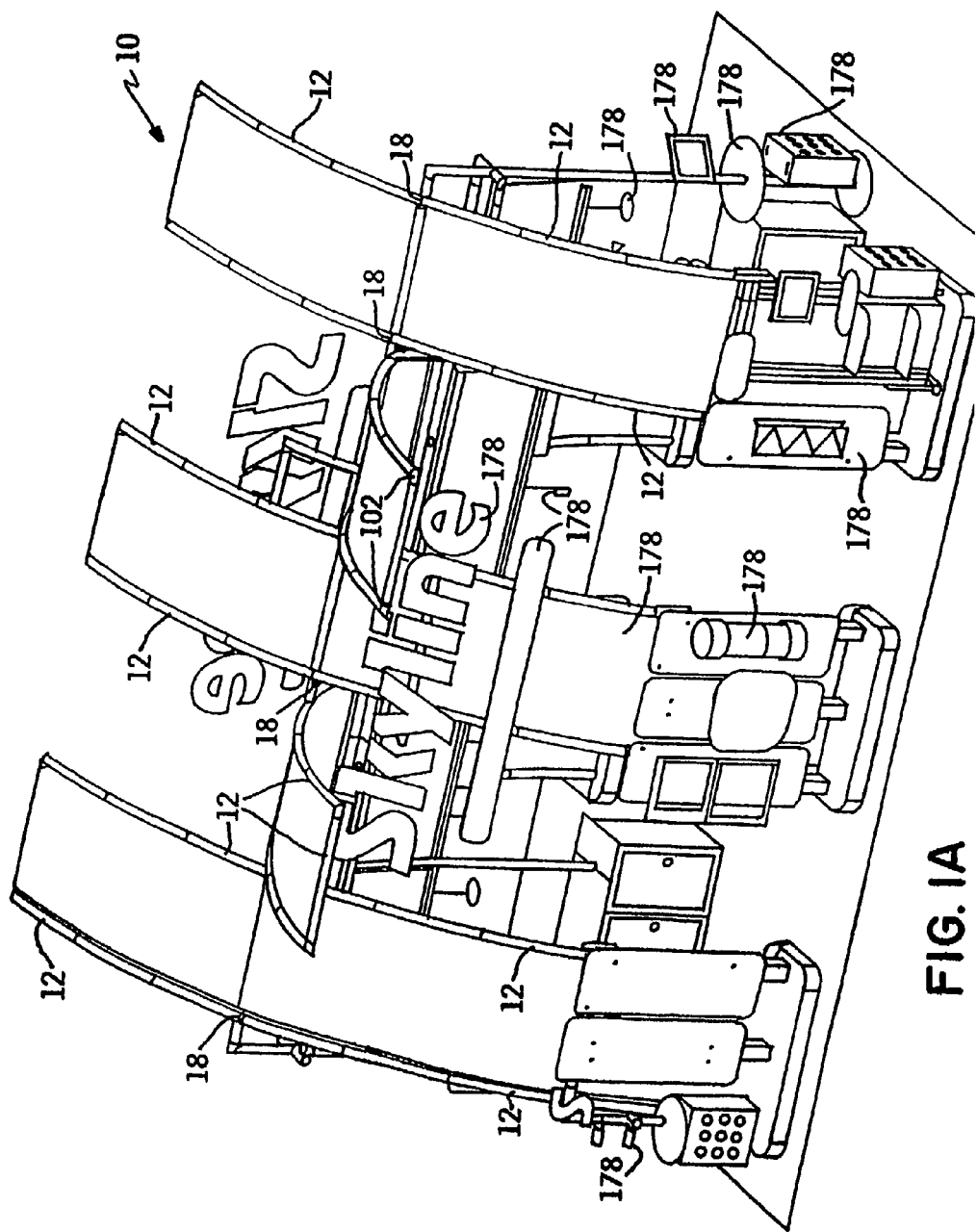
FIG. 1a is perspective view of a display system constructed of a framework connection system in accordance with an embodiment of the present invention.
Figure 1B:
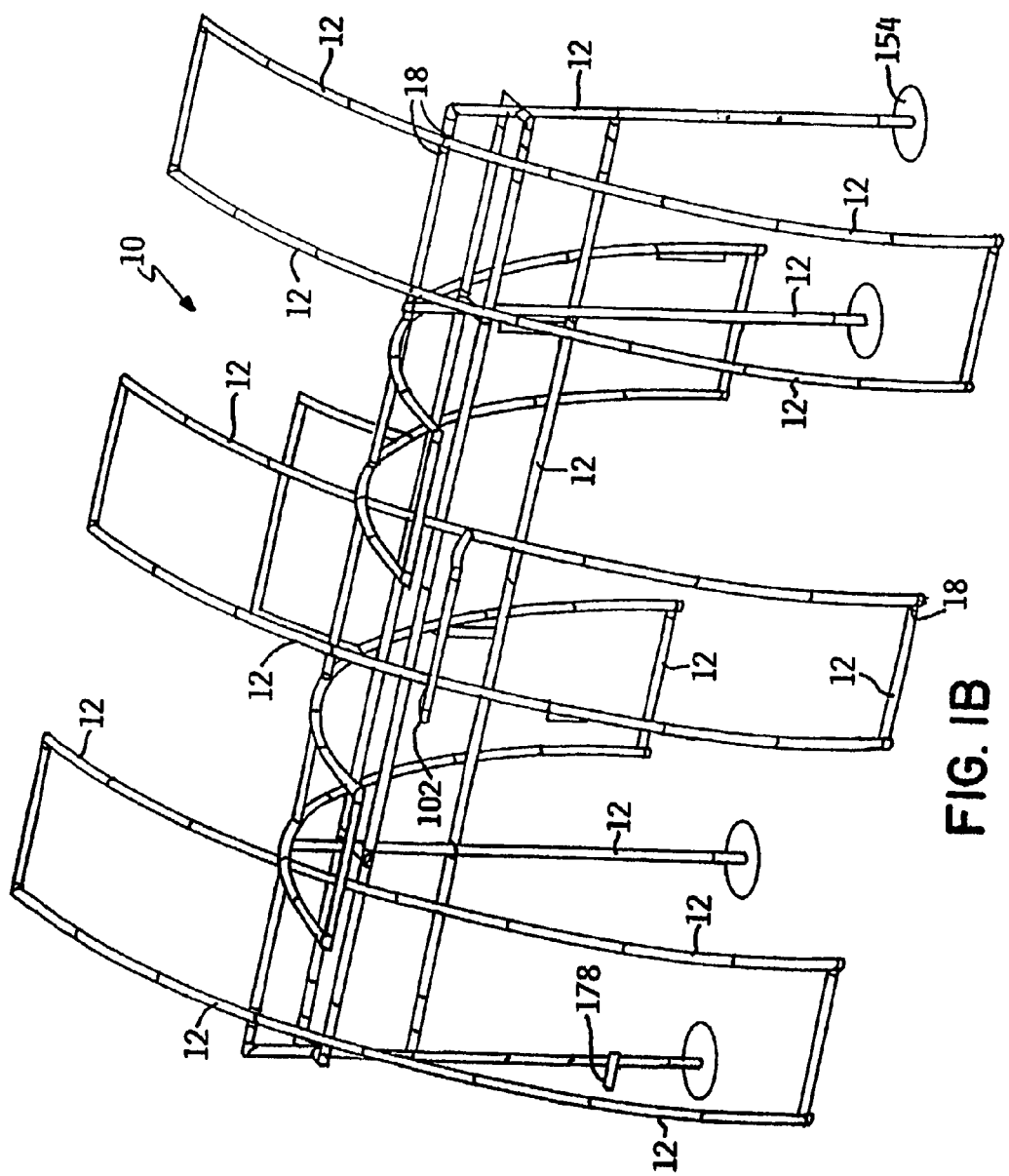
FIG. 1b is perspective view of a display system constructed of a framework connection system in accordance with an embodiment of the present invention.
Figure 1C:
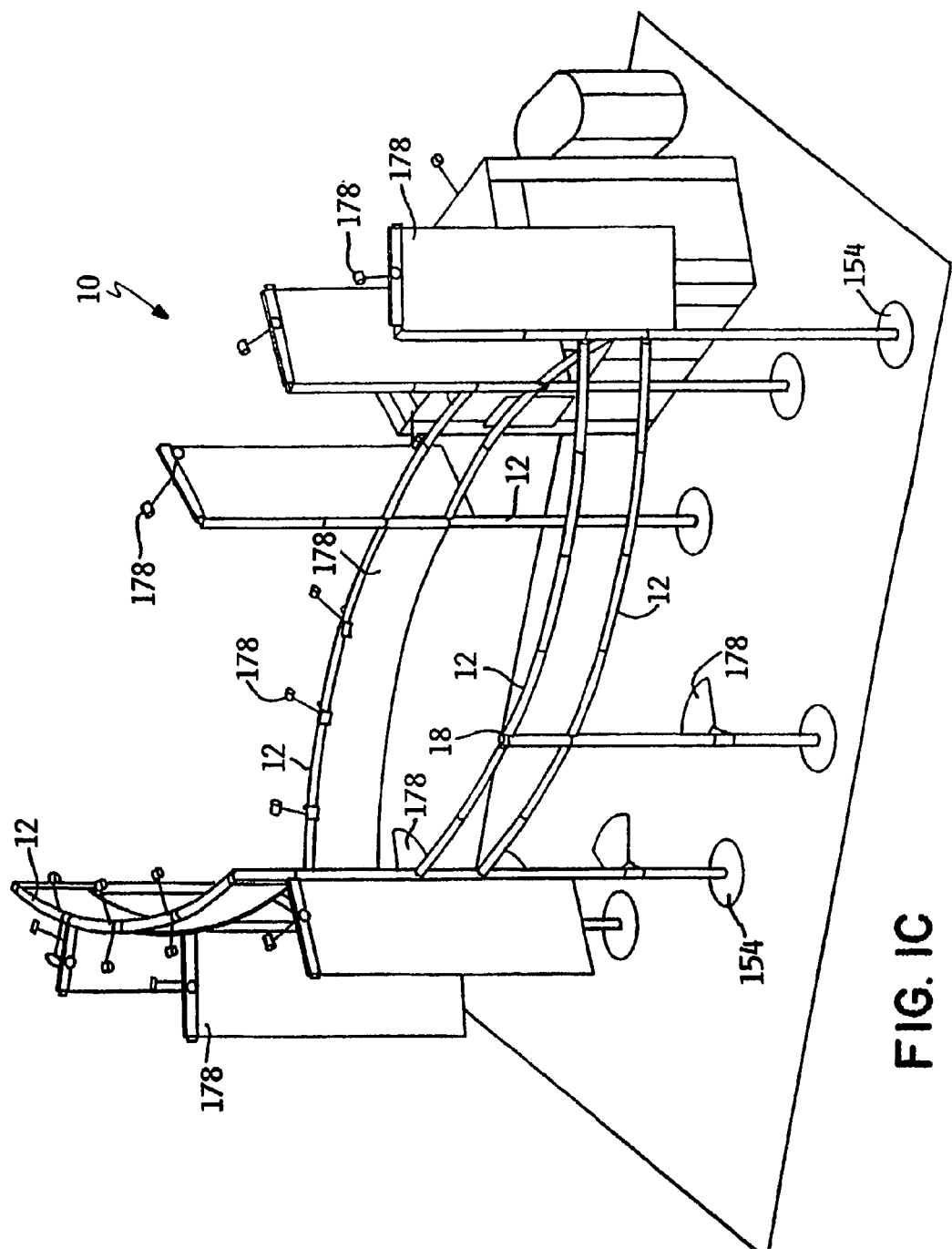
FIG. 1c is perspective view of a display system constructed of a framework connection system in accordance with an embodiment of the present invention.

Referring primarily to FIGS. 1a–21, the framework connection system 10 in accordance with the present invention generally comprises a plurality of frame members 12, a plurality of end flanges 14, a hub plate assembly 16, and a hub assembly 18. Various embodiments of the system 10 components, means of connectivity, and configuration options are described and shown in attached Appendix A, which is hereby incorporated by reference in its entirety. The frame members or segments 12 can be tubular steel tubing members, but in alternative embodiments, other materials and shapes can be employed. Each of the end flanges 14 are insertably attachable to at least one end of the frame member 12 such that the flange 14 is fixed within at least a portion of the tubing member 12. The flanges 14 can be fixed to the end portion of the frame member 12 with a weldment bond to facilitate connectivity with other system 10 components. Other methods and techniques of attachment understood to one skilled in the art are also envisioned.

Figure 3:
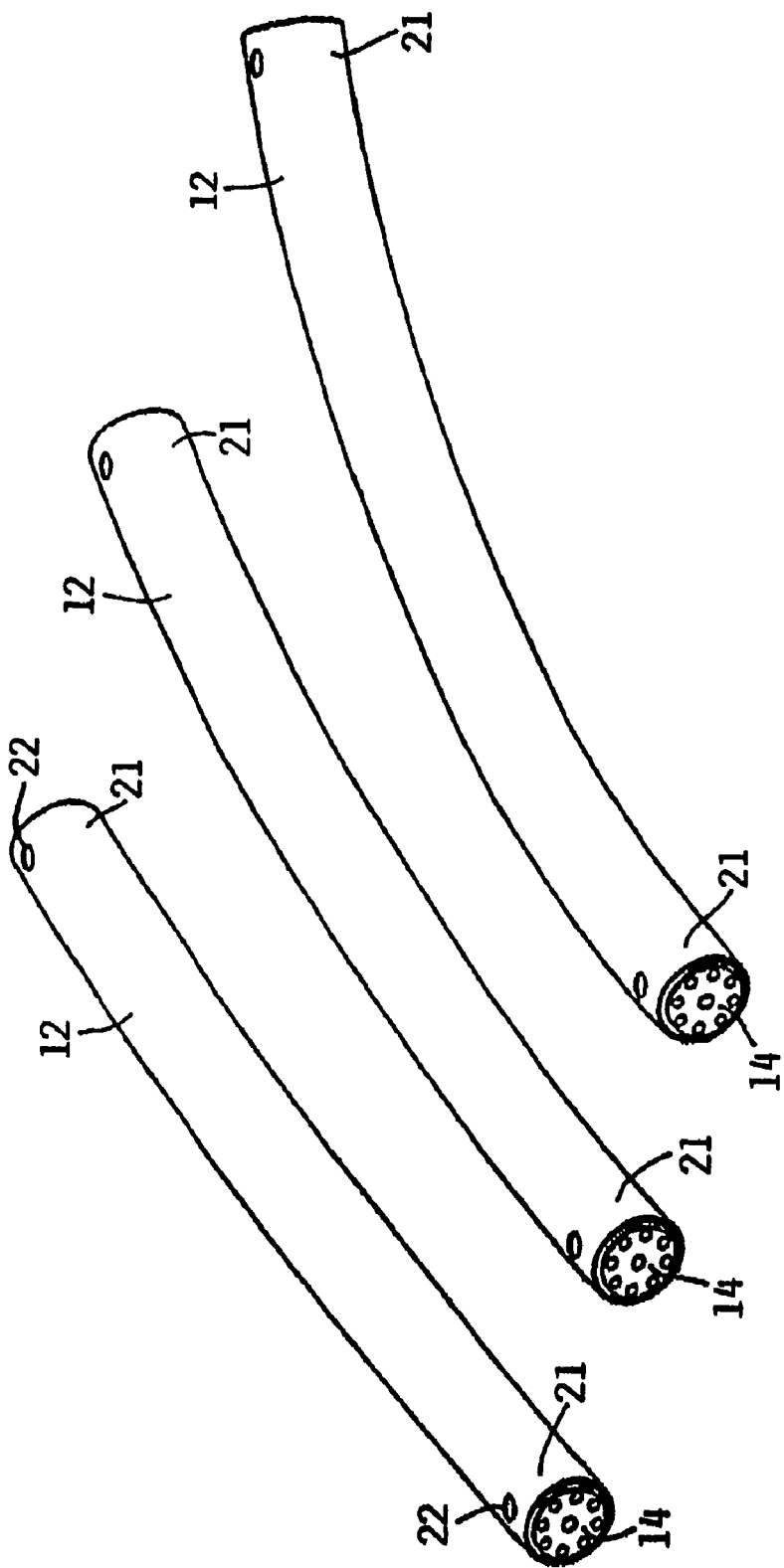
FIG. 3 is a perspective view of various curvilinear tubular frame members in accordance with an embodiment of the present invention.
Figure 4:
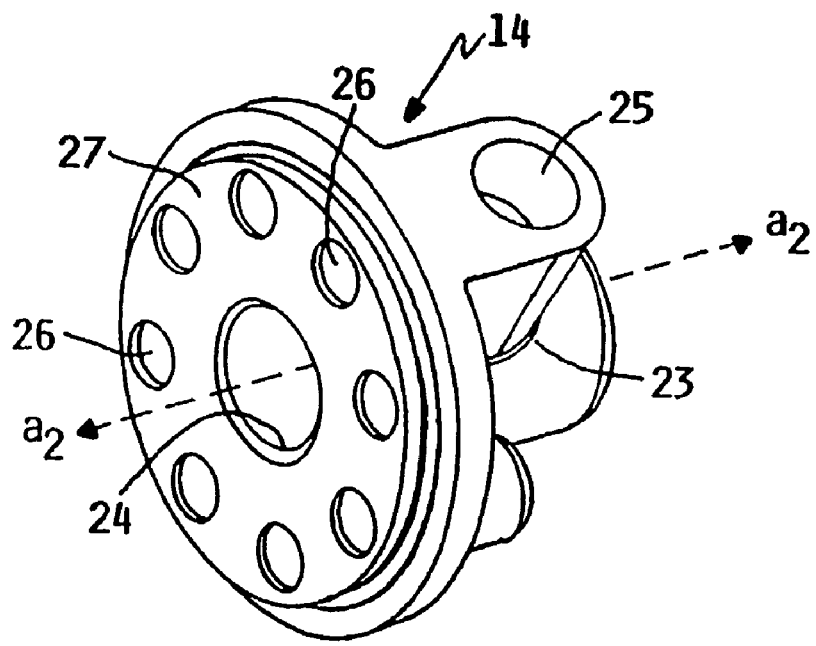
FIG. 4 is a perspective view of an end flange in accordance with an embodiment of the present invention.
Figure 5:
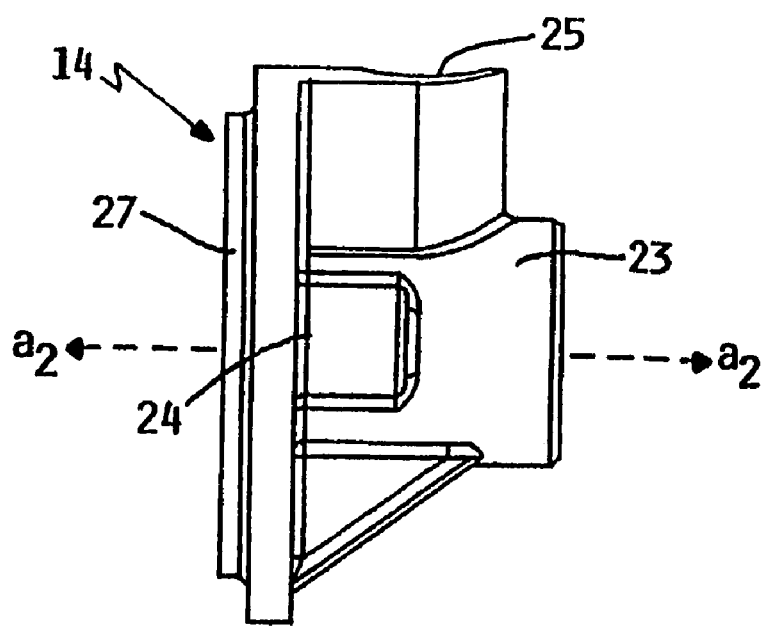
FIG. 5 is a side view of an end flange in accordance with an embodiment of the present invention.
Figure 6:
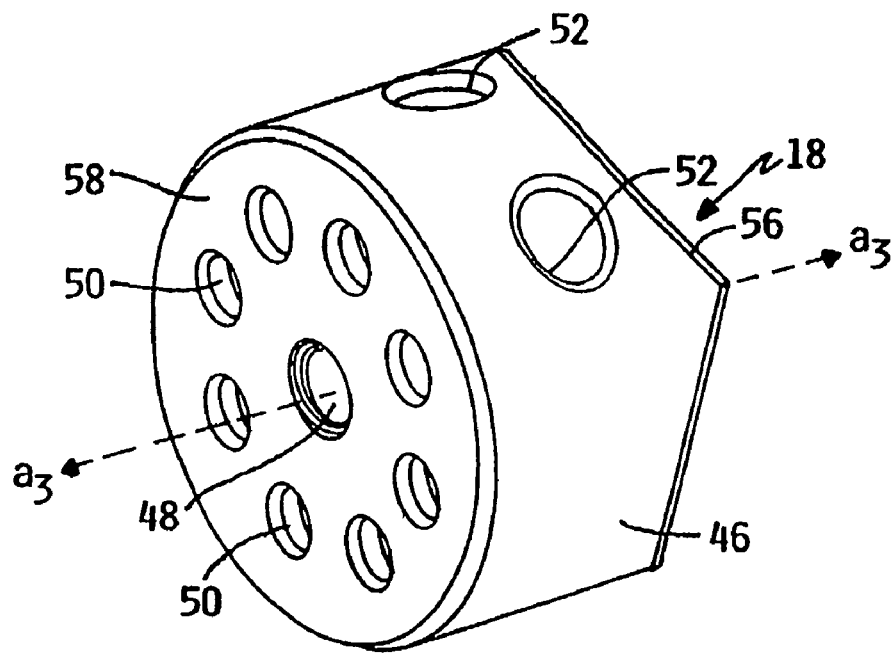
FIG. 6 is a perspective view of a hub assembly in accordance with an embodiment of the present invention.
Figure 7:
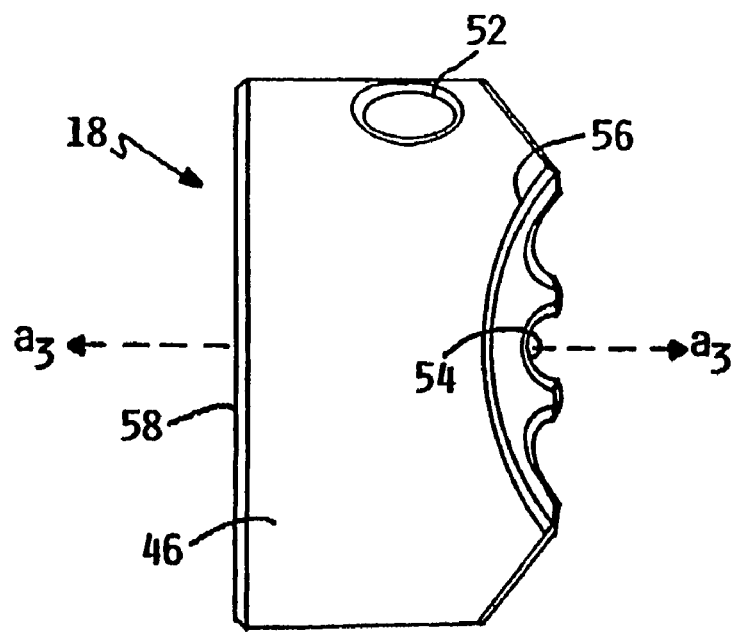
FIG. 7 is a side view of a hub assembly in accordance with an embodiment of the present invention.

Referring to FIGS. 1a–3, and 21, the frame members 12 of one embodiment can be constructed of cylindrical steel tubing having a central bore therethrough, and include an end portion 21 and end apertures or recesses 22 providing communication into the central bore. Wire management openings can further be included along the outer surface of the members 12 communicating into the central bore to provide wiring and cabling options throughout the framework. The longitudinal length of the frame members 12 define an axis $a_1$. The members 12 can be of varying lengths, depending on the needs of the user. Other embodiments can be constructed of plastics other suitable materials, and can be constructed of square or rectangular tubing, or other shapes typically used to form display frame constructions. In one of the tubular embodiments, the members 12 can have an approximate outer diameter of 2½ to 4 inches. This outer diameter is preferably consistent along the entire length of the tubing, with the length being variable depending on the configuration needs of the manufacturer or end user. The tubing wall thickness is preferably in the range of 0.025 to 0.250 inches, but other dimensions are also envisioned for use with the present invention. The members 12 can be straight or linear, as shown in FIG. 2, or arcuate or curvilinear, as shown in FIG. 3.

Figure 1E:
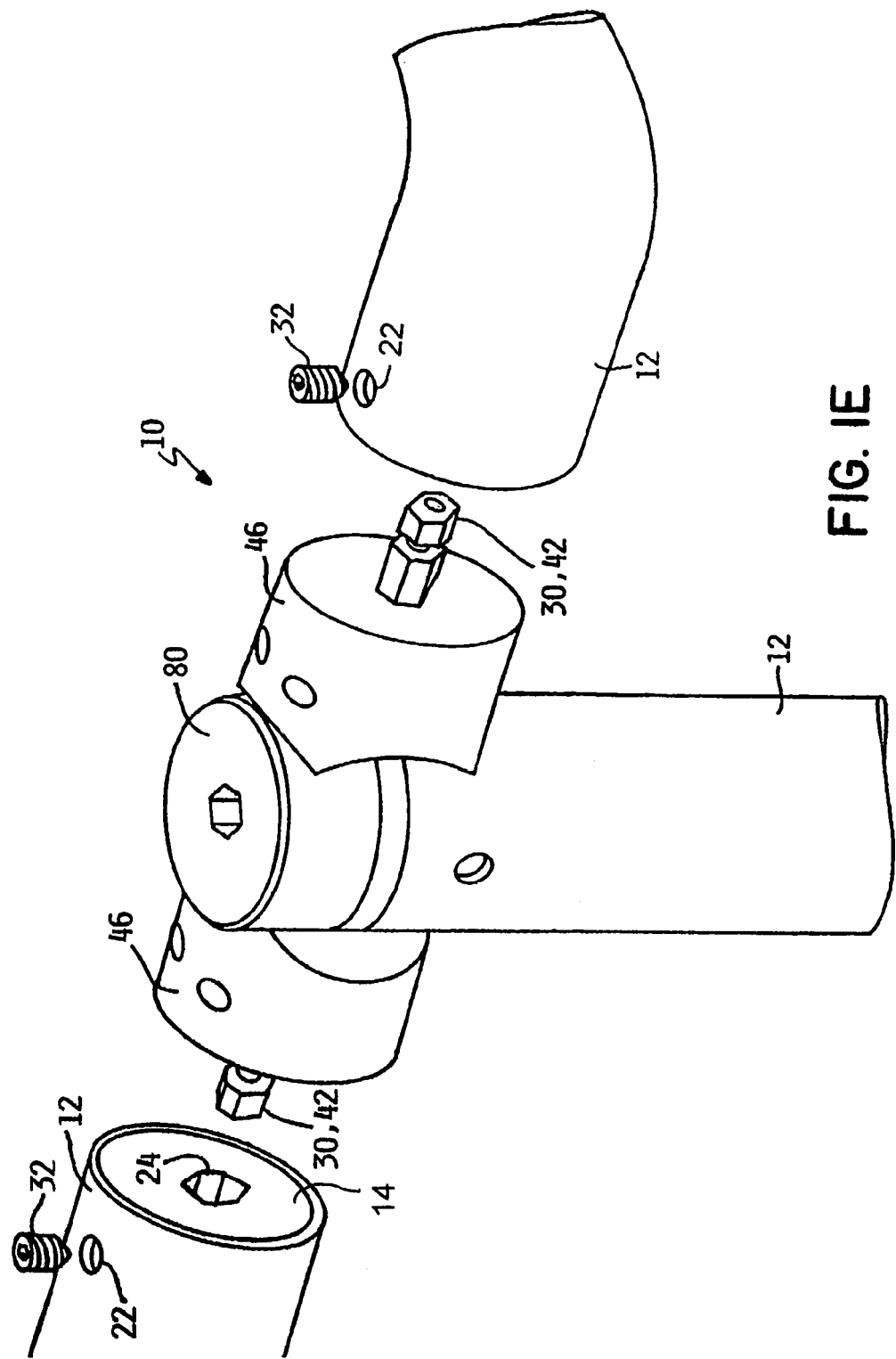
FIG. 1e is a perspective view of the connectivity of various components of a framework connection system in accordance with an embodiment of the present invention.

The inner diameter for the tubing bore is some size smaller than the outer diameter, for receiving the end flanges 14, with the end flanges 14 defining an axis $a_2$. The end flanges 14 include a body portion 23 and a face portion 27. The face portion 27 is generally cylindrical to match the shape of the end portion 21 of the frame members 12 such that the face 27 of the flange 14 substantially lines up with the end of the frame member 12, or is measurably inset, aligning axis $a_1$ and $a_2$. The flanges 14 can further include a central aperture or recess 24, a body aperture or recess 25, and a plurality of indexing or alignment apertures or recesses 26. Additionally, a plurality of indexing or alignment pins 28 selectively securable within the indexing apertures 26 can be provided. At least one connector pin 30, and at least one connector fastener 32 can be included as well. The connector pin 30 can include at least one securement groove 31 proximate at least one end of the pin 30. The connector pins referred to herein can be a one piece pin 30, or two distinct but joinable pins 42, 44, wherein one pin, i.e., pin 42, comprises male threading, and a second pin, i.e., pin 44, comprises female threading to facilitate connectivity. The longitudinal length of each pin 30, 42, 44 defines an axis $a_4$. Various components may require pin 30, others may require the connected combination of pins 42, 44, and yet others may only require the threadable insertion of pin 42. Regardless, reference herein to any of the referenced pins 30, 42, 44 is merely demonstrative as any one of the pins can provide the requisite connectivity described. Alternative embodiments of the pins 30, 42, 44 can take on various shapes, such as hexagonal or other non-cylindrical forms, along at least a portion of the longitudinal length. As such, the flats or edges of the non-cylindrical pin 30 are mateably inserted into the flange 14 central aperture 24 having a substantially similar shape such that rotation of the confronting tubing members 12 along the common axis $a_1$ is limited as shown in FIG. 1e.

Referring to FIGS. 1d–1e, and 4–5, the central aperture 24 traverses at least a portion of the face 27 of the flange 14 some distance inward through the body 23. The body aperture 25 traverses into the body 23 transverse or radial to the central aperture 24 such that the apertures 24, 25 are in fluid communication with each other. The body aperture 25 can further include a lip proximate the point of communication with the central aperture 24 to provide a stop for an inserted connector pin 30. When secured within the end portion 21 of the frame member 12, the body aperture 25 of the flange 14 is substantially aligned with the end aperture 22 of the frame member 12 such that a fastener, i.e., the at least one connector fastener 32, is insertable through both apertures 22, 25, radially in relation to axis $a_1$ and $a_2$, to fasten the connector pin 30 in place at the securement groove 31. The central aperture 24 and the body aperture 25 can be threaded for receipt of various fasteners and/or pins for component connectivity.

Figure 21:
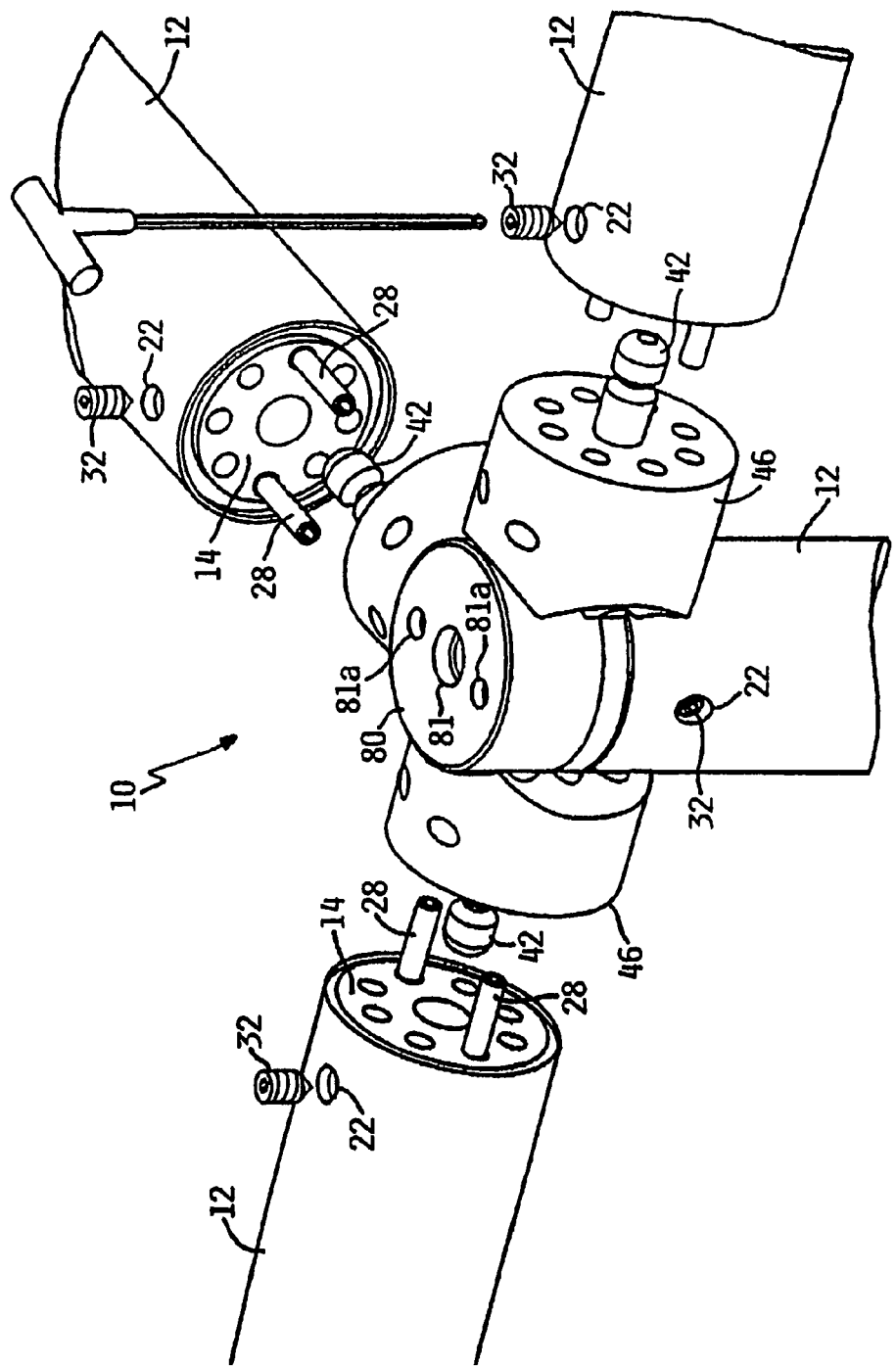
FIG. 21 is a perspective view of the connectivity of various components of a framework connection system in accordance with an embodiment of the present invention.

The indexing apertures 26 can also include a threading portion for receipt of the plurality of indexing pins 28. Preferably, the indexing apertures 26 are located along the face 27 of the flange 14, traverse in some distance through the face 27, and are spaced at predetermined intervals following the diametrical face 27 of the flange 14 to provide for various lockable engagement options. The receivable indexing pins 28 can include a threaded portion to engage corresponding threading in the indexing apertures 26. The indexing pins 28 can provide for needed stability when insertably aligned within those components having index receiving apertures. The primary stability function of the indexing pins 28 is to limit rotation of the member 12 in relation to interlocked components—i.e., another axially connected frame member 12 with flange 14, or a connected hub assembly 18 as shown in FIGS. 1d–1e, and 21. Rotational movement about the longitudinal axis $a_1$ of the member 12 is restricted by the interlocked indexing pins 28.

A limited portion of the connector pin 30 can be inserted into the central aperture 24, aligning axis $a_2$ and $a_4$, such that one of the grooves 31 is alignable with at least one of the end apertures 22 of the frame member 12. The connector fastener 32 is shaped and sized to be removably threaded into the end aperture 22 and through the body aperture 25 of the flange 14, radially in relation to axis $a_2$ and $a_4$, to securably engage the groove 31 of the connector pin 30, pulling or drawing the connector pin and the engaging component (i.e., a hub or frame member) into abuttable securement with the flange 14. The at least one connector fastener 32 can be a set screw, or other fastening means known to one skilled in the art for selectively engaging or locking with such a pin 30. Bolts, screws, and a myriad of other fasteners and fastening means are envisioned for use throughout the present invention when component connectivity is required. The various setscrew fasteners of the present invention can be easily adjustably threaded into the respective apertures or recesses utilizing a setscrew wrench, such as that shown in FIG. 21.

Figure 8:
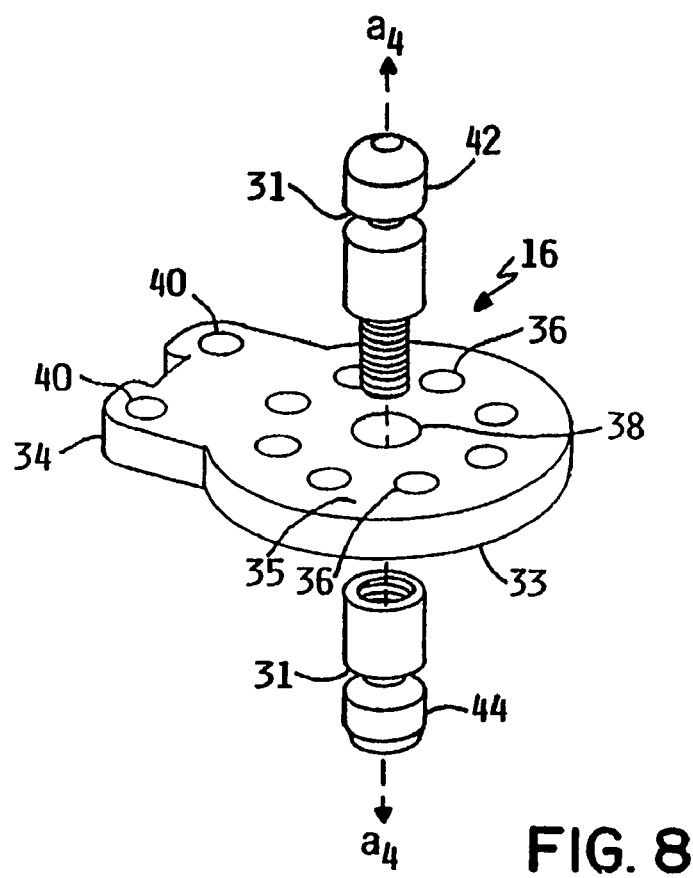
FIG. 8 is a perspective view of a single branch hub plate assembly in accordance with an embodiment of the present invention.
Figure 9:
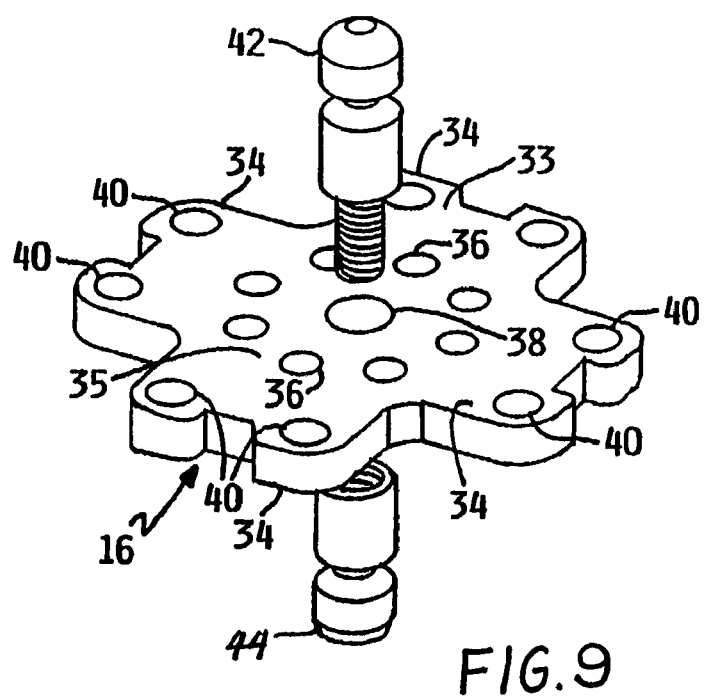
FIG. 9 is a perspective view of a four branch hub plate assembly in accordance with an embodiment of the present invention.
Figure 10:
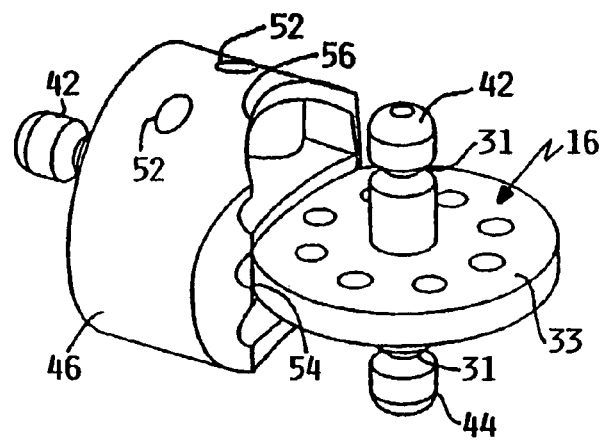
FIG. 10 is a perspective view of the connectivity of a hub assembly and a single branch hub plate assembly in accordance with an embodiment of the present invention.
Figure 11:
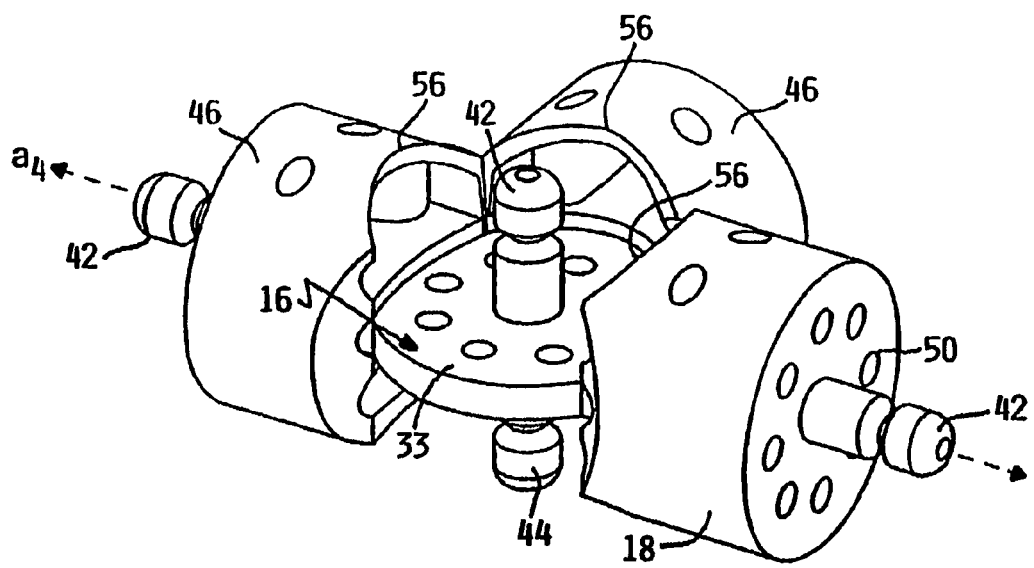
FIG. 11 is a perspective view of the connectivity of hub assemblies and a three branch hub plate assembly in accordance with an embodiment of the present invention.
Figure 12:
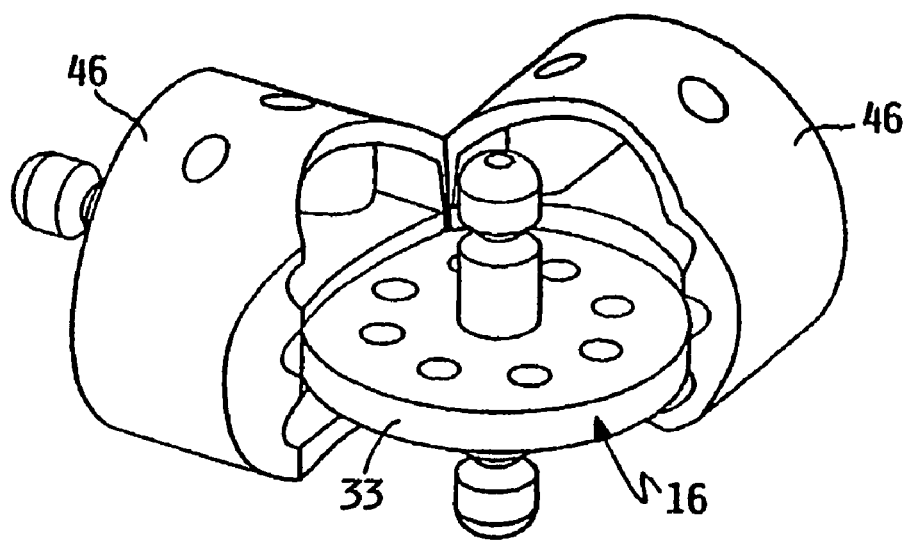
FIG. 12 is a perspective view of the connectivity of hub assemblies and a two branch hub plate assembly in accordance with an embodiment of the present invention.
Figure 13:
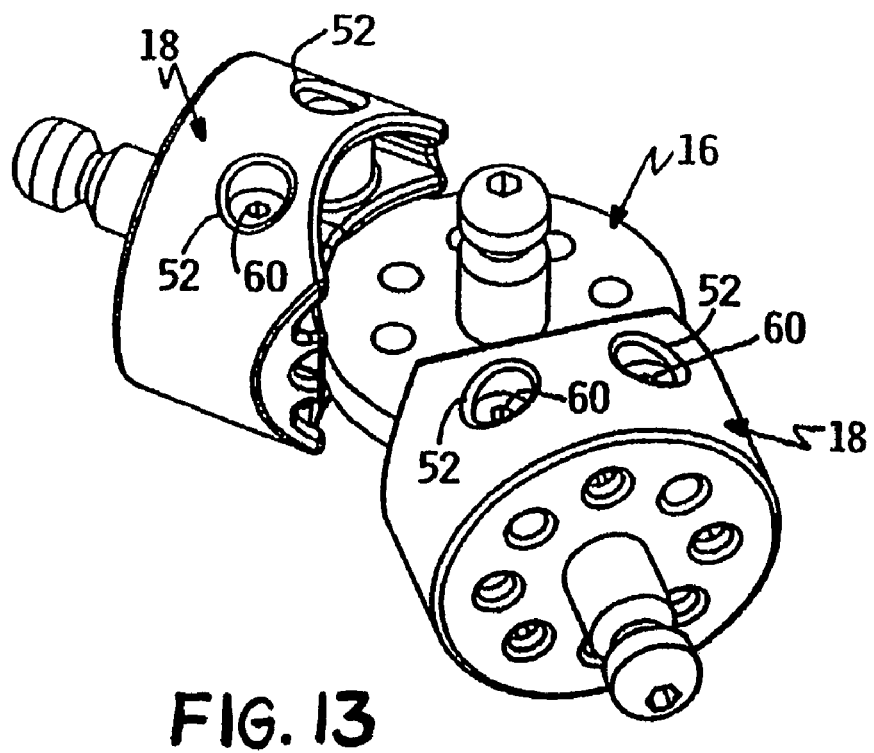
FIG. 13 is a perspective view of the connectivity of hub assemblies and an angular two branch hub plate assembly in accordance with an embodiment of the present invention.
Figure 14:
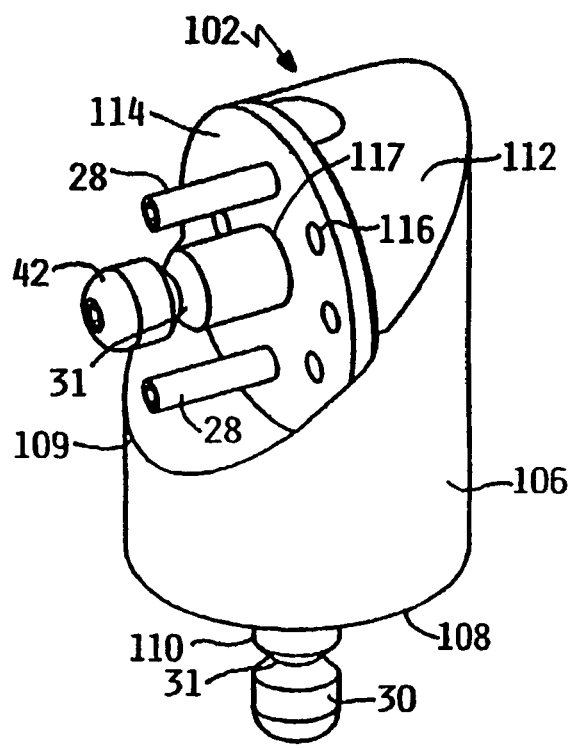
FIG. 14 is a perspective view of a fixed corner assembly in accordance with an embodiment of the present invention.
Figure 15:
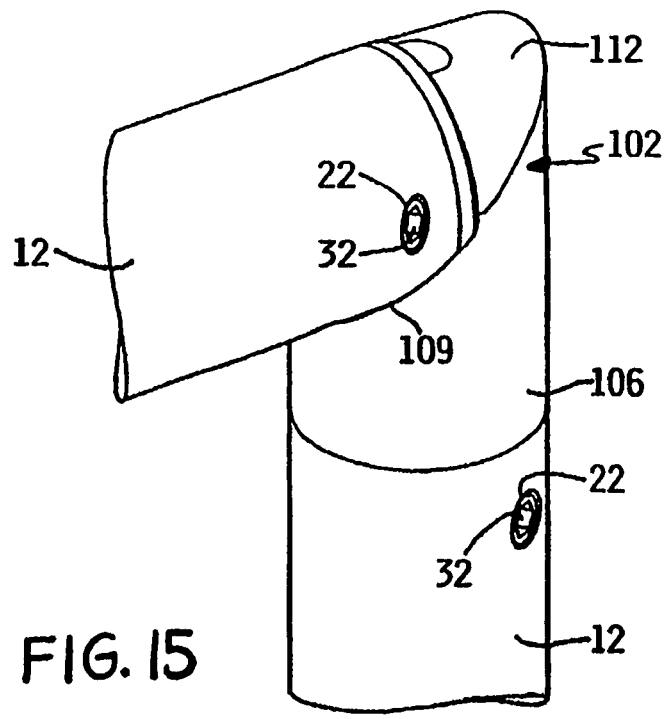
FIG. 15 is a perspective view of the connectivity of a fixed corner assembly and tubular frame members in accordance with an embodiment of the present invention.

Referring primarily to FIGS. 8–9, the hub plate assembly 16 can include a hub plate 33 having at least one connecting branch 34. The plate 33 can further include a plurality of index receiving apertures or recesses 36, and a central plate aperture or recess 38. Each of the connecting branches 34 of the hub plate 33 can include a plurality of branch apertures or recesses 40. The branch apertures 40 can completely pass through the branch 34; or they can define dimpled depressions in the branches 34. The hub-plate assembly 16 can further include a first plate connector pin 42 and a second plate connector pin 44, or alternatively, a single unitary-bodied pin. Preferably, the plate connector pins 42, 44 are removably connectable to one another through the central aperture 38. This connectivity option can be achieved with the use of a threaded portion, wherein one of the pins includes a female threaded portion and the other pin includes a mail threaded portion, and the connectivity of the pins 42, 44 leaves a non-threaded portion of each pin, and axis $a_4$, extending out transverse from the plane of the plate 33. Other known connection methods and techniques are also envisioned.

The hub plate 33 generally has a circular inner portion 35 preferably integral with the at least one connecting branch 34 such that the at least one branch 34 extends out from the inner portion 35 substantially along the same plane. The indexing apertures 36 are preferably spaced around the central aperture 38 through the circular inner portion 35 and are adapted to receive the indexing pins 28 for selective lockable engagement, as demonstrated in FIG. 1d. Embodiments of the hub plate 33 will employ varying branch 34 options, at varying angular configurations. For instance, one embodiment will include a single branch 34, as shown in FIG. 8. Other embodiments will include the angular branch 34 options shown in FIGS. 13 and 20. As the figures show, specific embodiments include connecting branches 34 extending away from the inner portion 35 of the hub plate 33 at ninety degree increments, while other embodiments include one-hundred-twenty degree and one-hundred-thirty-five degree increments. A myriad of angular branch 34 configurations in addition to those shown can be employed without deviating from the spirit and scope of the present invention.

Referring to FIGS. 6–7, and 10–13, embodiments of the hub assembly 18 are shown. The hub assembly 18 generally comprises a hub 46, and at least one connector fastener 60. The hub 46 can include a central hub aperture or recess 48, a plurality of index receiving apertures or recesses 50, at least one fastening aperture or recess 52, a receiving slot 54, at least one hub contour 56, and a hub face portion 58. In one embodiment, the hub 46 is generally cylindrical in cross-section (for certain cylindrical tubular frame member 12 systems), defines an axis $a_3$, and is adapted for connection to the frame member 12 by selectively securing a grooved portion 31 of the connector pins 30, 42 through the central hub aperture 48 with the connector fastener 60. Alternatively, the connector pin 42 can include a threaded portion threadably insertable into a mateable threaded central hub aperture 48 such that the groove portion 31 extends out from the hub face portion 58. Like the connector fastener 32 for the end flange 14, the connector fastener 60 of the hub assembly 18 can be a setscrew or like fastening means. As described herein, the other grooved portion 31 of the pin 42 is secured by the connector fastener 32 through the end aperture 22 of the frame member 12 and through the aligned body aperture 25 of the flange 14 such that it engages and selectively locks the connector pin 42 in place within the flange 14. As such, the hub 46 is lockably engaged to the end portion 21 of the frame member 12 at the end flange 14, thus aligning axis $a_1$ and $a_3$, as best demonstrated in FIGS. 1d–1e, and 21. This connection results in the receiving slot 54 facing out from the frame member 12.

In one configuration, the index receiving apertures 50 are located on, and pass through, the face portion 58 of the hub 46 for receivable alignment with the indexing pins 28 of the end flanges 14, or other components. The fastening apertures 52 pass through the outer circumferential surface of the hub 46, through the hub 46, and into communication with the central aperture 48 and the receiving slot 54. The receiving slot 54 passes through the central axis of the hub 46, at the portion of the hub 46 distal the face portion 58 and traverses a distance into the hub 46 short of the face portion 58. The slot 54 is generally sized and shaped so that it is capable of slidably receiving the at least one branch 34 of the hub plate 33, as demonstrated in FIGS. 10–13. Once received and positioned, at least one of the branch apertures 40 of the respective branch 34 is aligned and in communication with the fastening apertures 52 of the hub 46, wherein a connector fastener 60, such as is demonstrated in FIG. 13, locks the branch 34 in place. The at least one hub contour 56 is sized and shaped to enable confronting slidable engagement with the at least a portion of the outer circumferential surface of corresponding tubular frame members 12, as shown in FIGS. 1d–1e. As best demonstrated in FIGS. 1d, and 19–21, the contours 56 of multiple hubs 46 interlocked around the connecting braches 34 of the intermediate hub plate 33 provide sufficient spacing for receiving the flange 14 and indexing pins 28 of a respective transversely or radially aligned frame member 12.

The present invention 10 can further include corner joint assemblies 100, such as a fixed corner assembly 102 and/or a pivot corner assembly 104, as shown in FIGS. 14–18. The fixed corner assembly 102 of FIGS. 14–15 can include a fixed base portion 106 and a fixed angle portion 112. The fixed base portion 106 includes a plurality of base indexing apertures or recesses 108, a concave portion 109, and a central aperture or recess 110. The fixed angle portion 112 includes a corner face portion 114, a plurality of angle portion indexing apertures or recesses 116, and an angle portion central aperture or recess 117. The fixed angle portion 112, in one embodiment, is oriented substantially ninety degrees from the axis of the fixed base portion 106. Other fixed angles between the angle portion 112 and the base portion 106 are envisioned in alternative embodiments. The base indexing apertures 108 and the angle portion indexing apertures 116 are both adapted to receive the indexing pins 28 of the end flanges 14 to provide selective engagement of the fixed corner 102 to respective frame members 12 to provide angular corner portions in a design frame construction. Similarly, the central apertures 110, 117 of the fixed corner assembly 102 are capable of receiving connector pins 30, 42 for further securement at one end within the central aperture 24 of respective end flanges 14 for attachment using the connector fastener 32 and methods described herein. The concave portion 109 is sized and shaped to compatibly confront at least a portion of the outer circumferential surface of a respective frame member 12 upon connection of the end flange 14 to the fixed angle portion 112, as demonstrated in FIG. 15. Indexing pins 28 are also used as with any component capable of lockable engagement with the flange 14 of a frame member 12.

Figure 16:
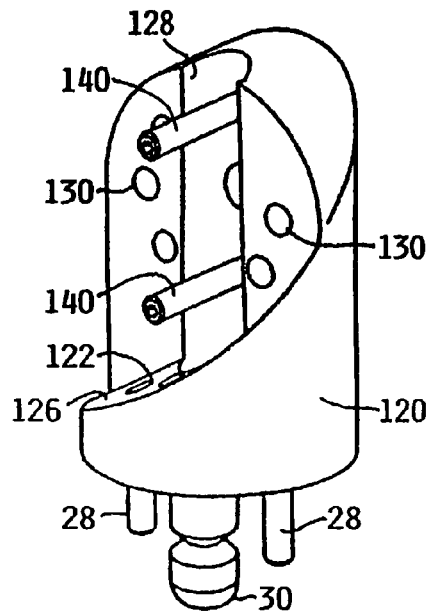
FIG. 16 is a perspective view of a portion of a pivot corner assembly in accordance with an embodiment of the present invention.
Figure 17:
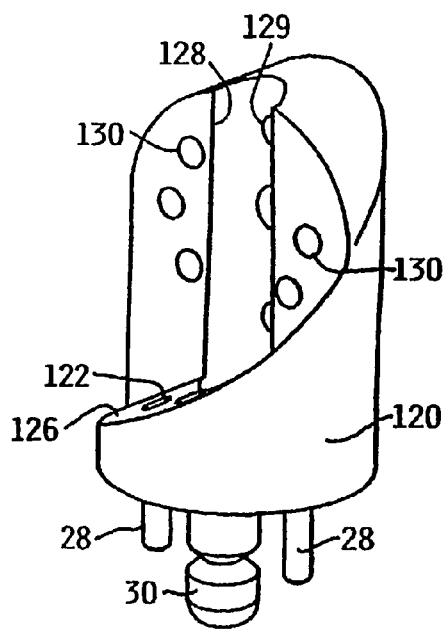
FIG. 17 is a perspective view of a portion of a pivot corner assembly in accordance with an embodiment of the present invention.
Figure 18:
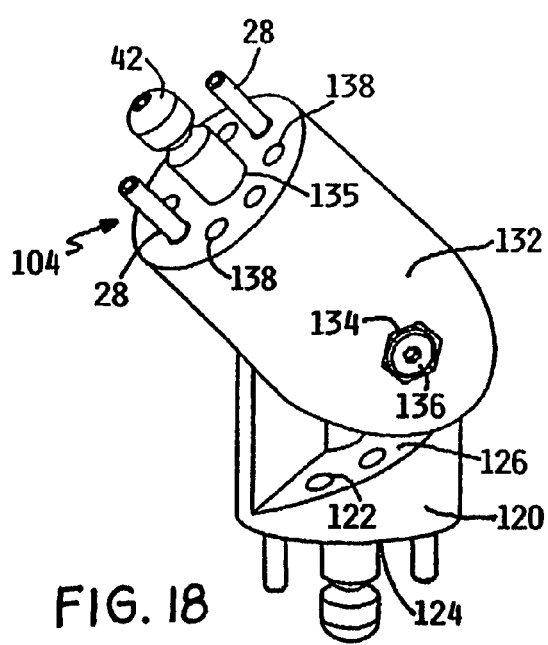
FIG. 18 is a perspective view of an assembled pivot corner assembly in accordance with an embodiment of the present invention.

The pivot corner assembly 104 of FIGS. 16–18 can include a pivot base portion 120, and a pivot arm 132.

Locking interval pins 140 can also be included. The pivot base portion 120 can include pivot base first indexing apertures or recesses 122, a pivot base central aperture or recess 124, a pivot base concave portion 126, a pivot base axial groove 128, and pivot base second indexing apertures or recesses 130. The pivot arm 132 includes a pivot aperture or recess 134, a pivot central aperture or recess 135, a pivoting device 136, and pivot arm indexing apertures or recesses 138. The pivot arm 132 is capable of pivotable movement around the pivot device 136 for selective angular configurations. When a specific angular setting is obtained, the pivot device 136, such as a pin, screw, bolt, and the like is lockably secured to temporarily fix the pivot arm 136 at the desired angle. In the embodiment of FIG. 16, the locking interval pins 140 are insertable into a portion of the pivot arm 136 to further stabilize the pivot arm 36 upon setting the arm 136 to the desired angle. These locking interval pins 140 are generally insertable into groove apertures or recesses 129 within the axial groove 128 of the base portion 120, and can provide predefined, but selective, angular configurations for the pivot arm 136 of approximately zero degrees, forty-five degrees, and ninety-degree increments. Other pre-defined angular options are also envisioned. Without the interval pins 140, the arm 136 is capable of adjustment along a myriad of angular settings. Again, the central apertures 124, 135 of the pivot corner assembly 104 are capable of receiving connector pins 30, 42 for further securement at one end within the central aperture 24 of respective end flanges 14 for attachment using the connector fastener 32 and methods described herein. The concave portion 126 defines a curved surface allowing the end of the pivot arm 136, distal the pivot central aperture 135, free pivoting movement. Indexing pins 28 are also used as with any component capable of lockable engagement with the flange 14 of a frame member 12.

Figure 19:
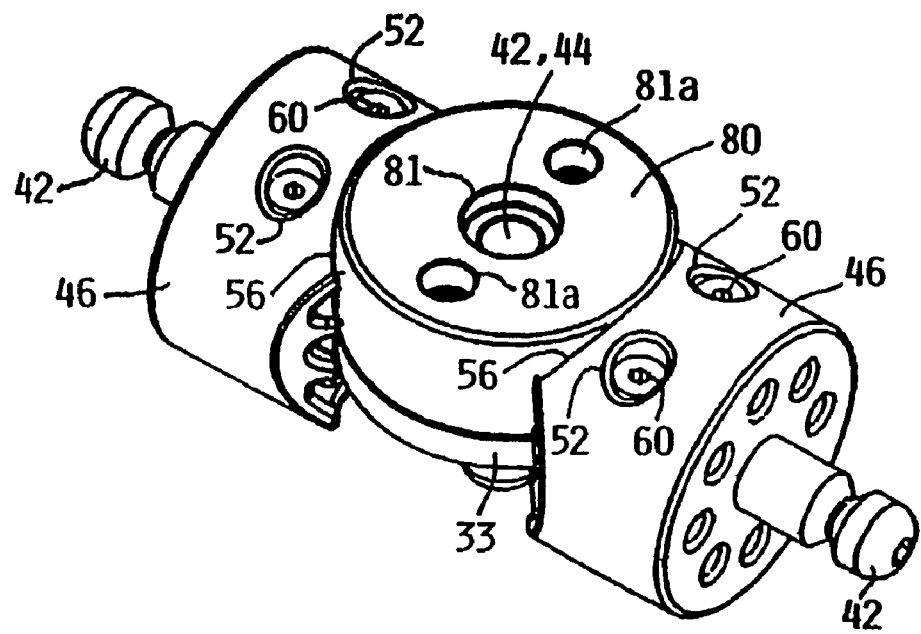
FIG. 19 is a perspective view of the connectivity of hub assemblies, a two branch hub plate assembly, and an end cap in accordance with an embodiment of the present invention.
Figure 20:
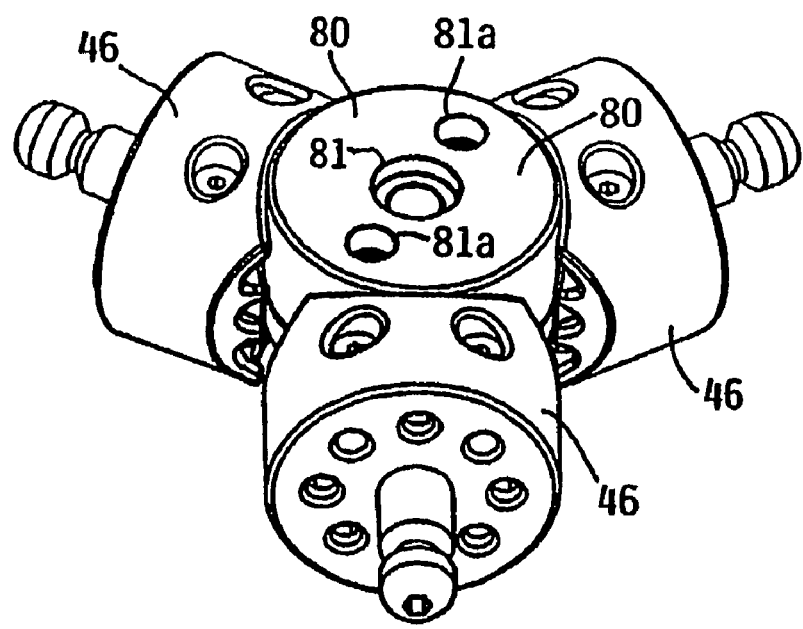
FIG. 20 is a perspective view of the connectivity of hub assemblies, an angular three branch hub plate assembly, and an end cap in accordance with an embodiment of the present invention.

Referring primarily to FIGS. 19–31, various plates, caps, end plates, and like components can be attached to frame member 12 end portions 21 via the versatile and modular end flange 14 design and/or the hub plate 33. For instance, FIGS. 19–21 show the implementation of an end filler cap 80 attachable to the hub plate 33 which is thereby secured to the flange 14 of the frame member 12. The end filler cap 80 can include at least one cap aperture or recess 81, and a plurality of cap indexing apertures or recesses 81a. The at least one cap aperture 81 can receive any one of the connecting pins 30, 42 to provide coupleable engagement with the hub plate central aperture 38 and the central aperture 24 of the flange 14. The connecting pin, preferably one of the two joinable pins 42, 44, is then locked in place with the connector fastener 32 through the end aperture 22 of the frame member 12. Again, the indexing pins 28 can provide rotational stability. The cap indexing apertures 81a can receive one end of the indexing pins 28 while the other is aligned with an indexing aperture 26 of the flange 14. End filler caps 80 of the present embodiment can increase aesthetic appeal by closing off exposed hub 18 and hub plate 16 components. Further, the end filler caps 80 can increase stability and strength of frame member 12 junctures by filling in the voids between the hub 18 and hub plate 16 assemblies. The hub contours 56 of proximate hub assemblies 18 in a hub juncture, such as those shown in FIGS. 19–21, are each generally shaped and sized to engage a portion of the circumferential surface of the end filler cap 80.

Figure 22:
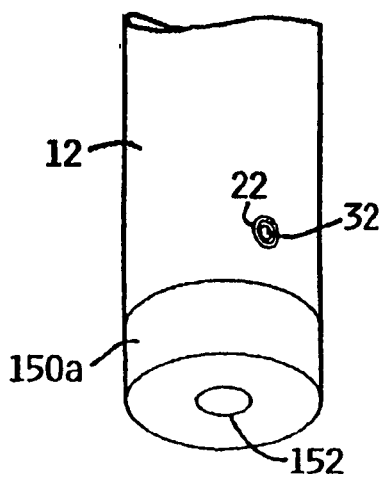
FIG. 22 is a perspective view of an end cap and tubular frame member in accordance with an embodiment of the present invention.
Figure 23:
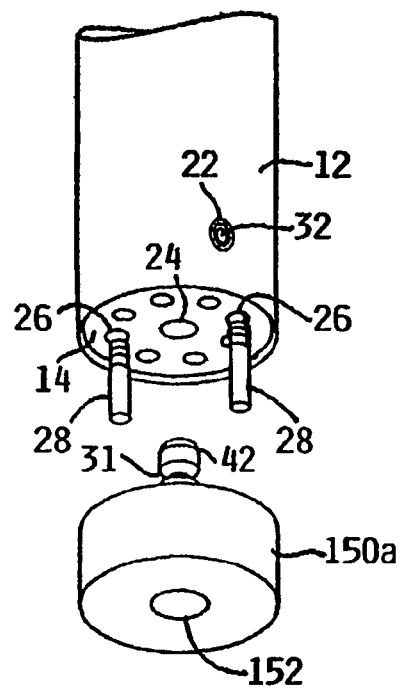
FIG. 23 is a perspective view of the connectivity of an end cap and tubular frame member in accordance with an embodiment of the present invention.
Figure 24:
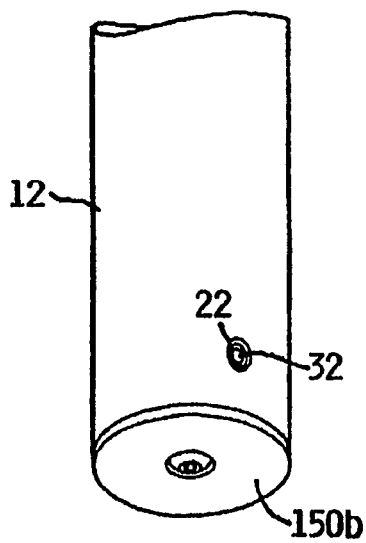
FIG. 24 is a perspective view of an end cap and tubular frame member in accordance with an embodiment of the present invention.
Figure 25:
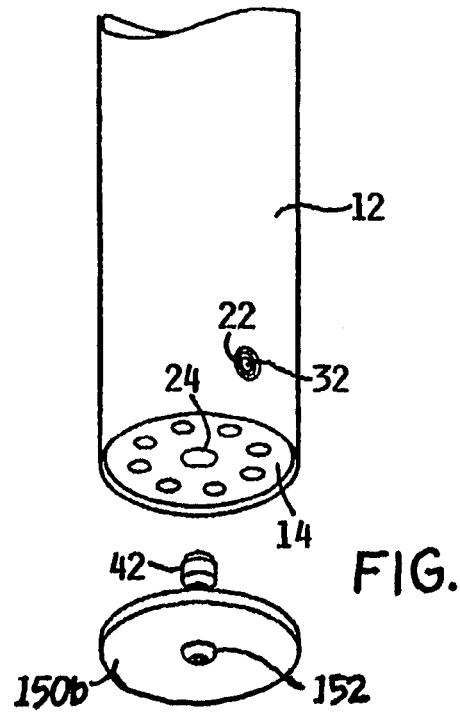
FIG. 25 is a perspective view of the connectivity of an end cap and tubular frame member in accordance with an embodiment of the present invention.

Various end caps 150a, 150b can also be employed with the present invention to cap off exposed flanges 14 of the members 12. For instance, FIGS. 22–25 show two embodiments of the end caps 150a, 150b coupled in such a manner. FIGS. 22–23 show a large end cap 150a the cap 150a including a cap aperture or recess 152 for securably receiving one of the connector pins 42, 44 for insertion into the central aperture 24 of the flange 14. In a preferred embodiment, a pin 42 having male threading at one end is threadably secured within the cap aperture 25 such that a grooved end 31 of the pin 42 is insertable within the central aperture 24 of the flange 14. As such, fastener 32 engages the groove 31 of the connector pin 42 through the end aperture 22 of the frame member 12 to selectively lock the cap 150a in place. In addition, indexing pins 28 within the indexing apertures 26 of the flange 14 can be inserted into aligned apertures in the cap 150a to provide rotational stability. FIGS. 24–25 show a thin end cap 150b, wherein the end cap 150b includes the cap aperture 152 for threadably receiving the threaded connector pin 42. Again, a grooved portion 31 of the connector pin 42 is insertable within the central aperture 24 of the flange 14 to provide selective lockable engagement with fastener 32 through end aperture 22 of the frame member 12. In at least one embodiment, this relatively thin end cap 150b embodiment does not utilize indexing pins 28. Aesthetic appeal and functionality are enhanced with each of the end caps 150a, 150b.

To facilitate standing frameworks, it may be necessary to include various stands, feet, pods and other supporting members at end portions of particular frame members 12. FIGS. 26–31 demonstrate embodiments of these supporting members adapted for implementation with the present invention. In FIGS. 26–27 a base stand 154 including a base stand coupling 156 is shown for use with the present invention. The base stand 154 is generally disc shaped and can be of varying sizes depending on the support needs of the particular framework configuration. Other shapes and proportional configurations are envisioned as well. The base stand coupling 156 is connectably positioned on the base stand 154 for lockable engagement with the hub plate 33 of the hub plate assembly 16 or the flange 14 of the frame member 12. When connected to the hub plate 33, connector pin 42 can be insertable within the flange 14 central aperture 24, while the other connector pin 44 is insertable into the base standing coupling through a centrally traversing coupling aperture 158. A side stand fastening aperture 160 transverse to, but in communication with, the coupling aperture 158 can be included for receiving the connector fastener 60 to lock the base stand 154 against the grooved portion 31 of the inserted pin 44. Indexing pin 28 can be utilized to further secure the base stand 154 to the hub plate assembly 16 for increased rotational stability.

Figure 31:
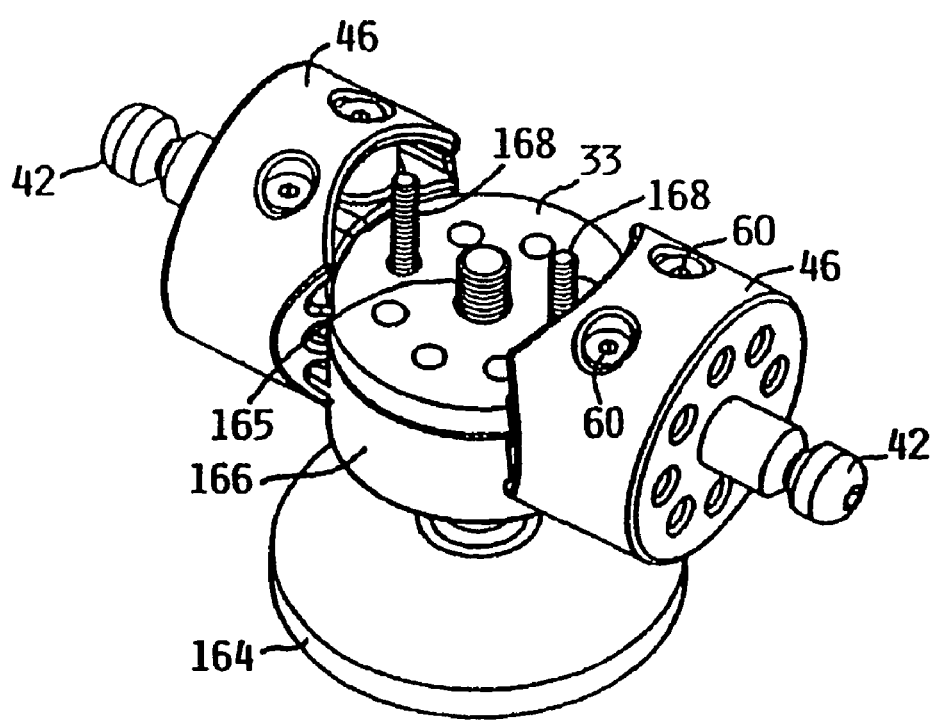
FIG. 31 is a perspective view of the connectivity of hub assemblies, a two branch hub plate assembly, and a base pod in accordance with an embodiment of the present invention.
Figure 33:
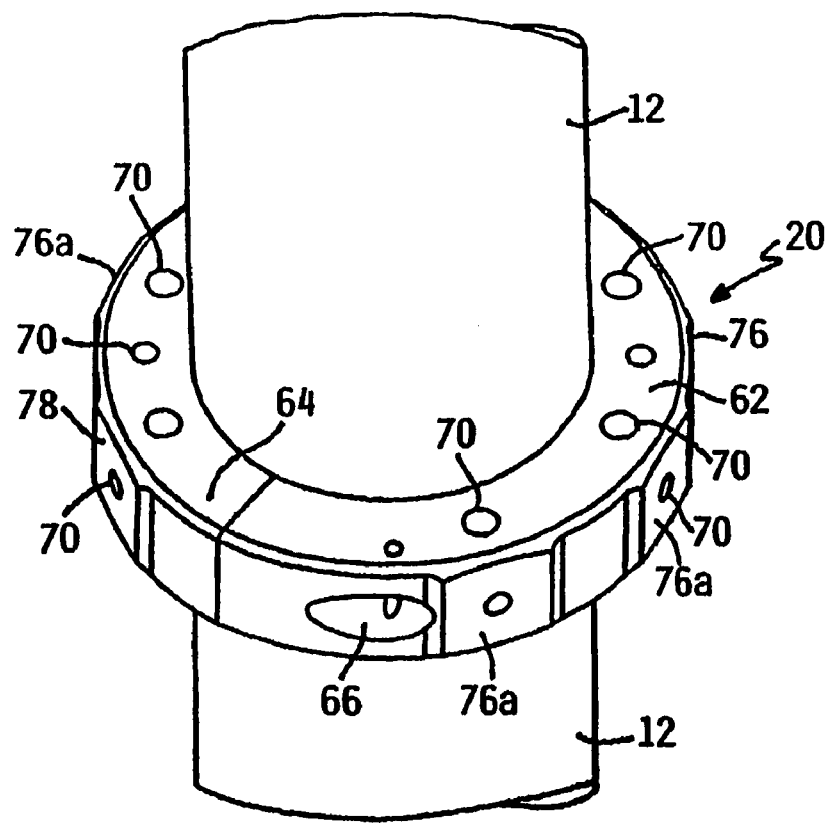
FIG. 33 is a perspective view of the connectivity of a two piece clamp assembly and a tubular frame member in accordance with an embodiment of the present invention.

Referring primarily to FIGS. 27–29, and 31, a foot pod system 162 is shown. The foot pod system 162 includes a base pod 164, a base cap 166, and at least one pod fastener 168. The base pod 164 is generally disk shaped and includes a threaded shaft 165 extending out from the pod 164. The base cap 166 can include a plurality of base cap apertures or recesses 170. In attaching the foot pod 162 to the flange 14 of the frame member 12, the hub plate 33 is positionally aligned intermediate the flange 14 and the base cap 166 such that the pod fasteners 168 can be inserted up into the base cap apertures 170, through the index receiving apertures 36 of the hub plate 33, and into the indexing apertures 26 of the flange 14, as best shown in FIG. 28. Upon alignment, the fasteners 168 can be tightened to fasten the base cap 166 to the hub plate 33 at the end portion 21 of the frame member 12. The threaded shaft 165 of the base pod 164 can then be threadably inserted and secured within one of the base cap apertures 170, as shown in FIG. 29. As such, a support stand or pod is provided at the end of the respective frame member 12 to increase stability and support for the framework system 10. FIG. 31 shows another view of an embodiment of the foot pod system 162, with base cap 166, being connected through to the hub plate 33 of a two hub assembly 18 system.

An alternate embodiment of the foot pod system 162 is included in FIG. 30. This embodiment includes the base pod 154 and corresponding threaded shaft 165. However, connectivity with the frame member 12 can be achieved without the base cap 166 or intermediate hub plate 33. To facilitate this connection to the flange 14 of the frame member 14, the threaded shaft 165 can further include an end ball joint 176, and a longitudinally threadably adjustable elongate nut 172 having an intermediate groove 174. The elongate nut 172 is insertable along with the threaded shaft 165 into the central aperture 24 of the flange 14, along aligned axis $a_1$ and $a_2$, wherein the fastener 32, such as the setscrew 32, can secure the foot pod 162 in place by engaging the intermediate groove 174 of the elongate nut 172. Longitudinal adjustments of the elongate nut 172 along the length of the threaded shaft 165 provide for selective height adjustments for the pod 162 in relation to the respective frame member 12. The ball joint 176 is at least partially shrouded within the base pod 164 to enable angular adjustments of the shaft 165 in relation to the base pod 164.

Referring to FIGS. 32–36, the framework connection system 10 can further include a clamp assembly 20. In one embodiment, the clamp assembly 20 can include a first clamp 62, a second clamp 64, and lock fasteners 68, with each clamp including locking channels 66, attachment apertures 70, inner circumferential surfaces 72, outer circumferential surfaces 76, and an inner attachment lining 74. In those embodiments utilizing cylindrical tubing frame members 12, the clamp assembly 20 is substantially cylindrical, with the inner surface 72 sized and shaped for confronting engagement around the outside surface of the frame members 12. In addition, the outer circumferential surfaces 76 of the clamps 62, 64 can include surface flats 76a. Any surface of the clamps 62, 64 can include the attachment apertures 70, including the flats 76a. Unlike conventional clamping devices, the clamp assembly 20 of the present invention permits selective placement and removal of the claim assembly 20 along the length of the frame member 12 without the need to remove all frame attachments or appurtenances. The clamp portions 62, 64 can be separated and removed, wherein conventional unitary-bodied clamps require users to slide the clamp off an end portion of the frame member after removing each shelf, lamp, or other appurtenance that may be positioned between the clamp and the end of the frame member.

The first clamp 62 and the second clamp 64 are joined at the confronting locking channels 66 of the respective clamps 62, 64 for selective engagement with a corresponding frame member 12. The locking fasteners 68, such as screws, bolts, and like means are inserted into the channels 66 to secure the clamps 62, 64 together around the frame member 12. Other locking means known to one skilled in the art can also be employed.

The inner attachment lining 74 is generally positioned along the inner circumferential surfaces 72 of the clamps 62, 64, and as a result, can include two separate linings 74. The lining 72 can serve many purposes, such as minimizing damage to the frame member 12 during the positioning, adjusting, and removing of the clamp assembly 20 from the frame members 12, and to facilitate attachment. In one embodiment, the attachment lining 74 can be constructed of plastics, rubbers, or other like materials to protect the surfaces of the clamp assembly 20 and the engaged frame member 12 from scratching, and to provide effective slidability. In another embodiment, the lining 74 is constructed of a magnetic material or member to facilitate ease-of-attachment and stability during use. In both embodiments, the lining 74 can be attached to the inner surfaces 72 of the clamps 62, 64 with adhesives or other known bonding techniques and means.

Figure 32:
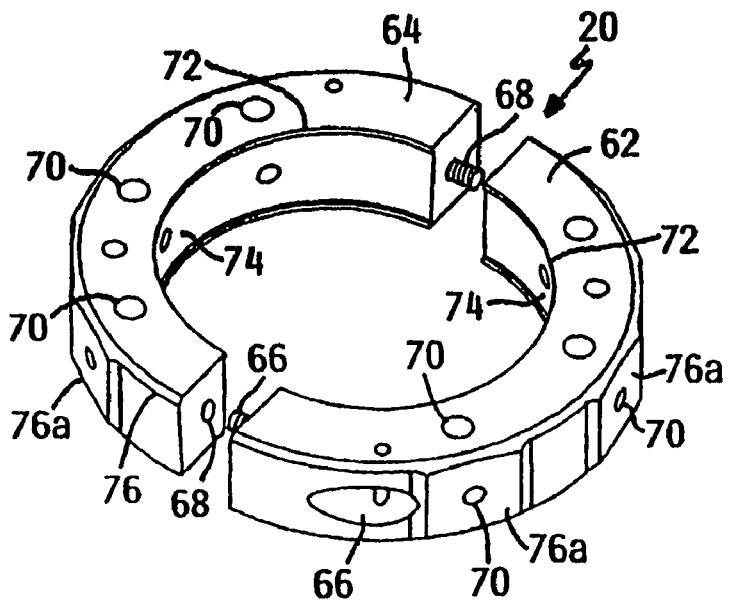
FIG. 32 is a perspective view of a two piece clamp assembly in accordance with an embodiment of the present invention.
Figure 32A:
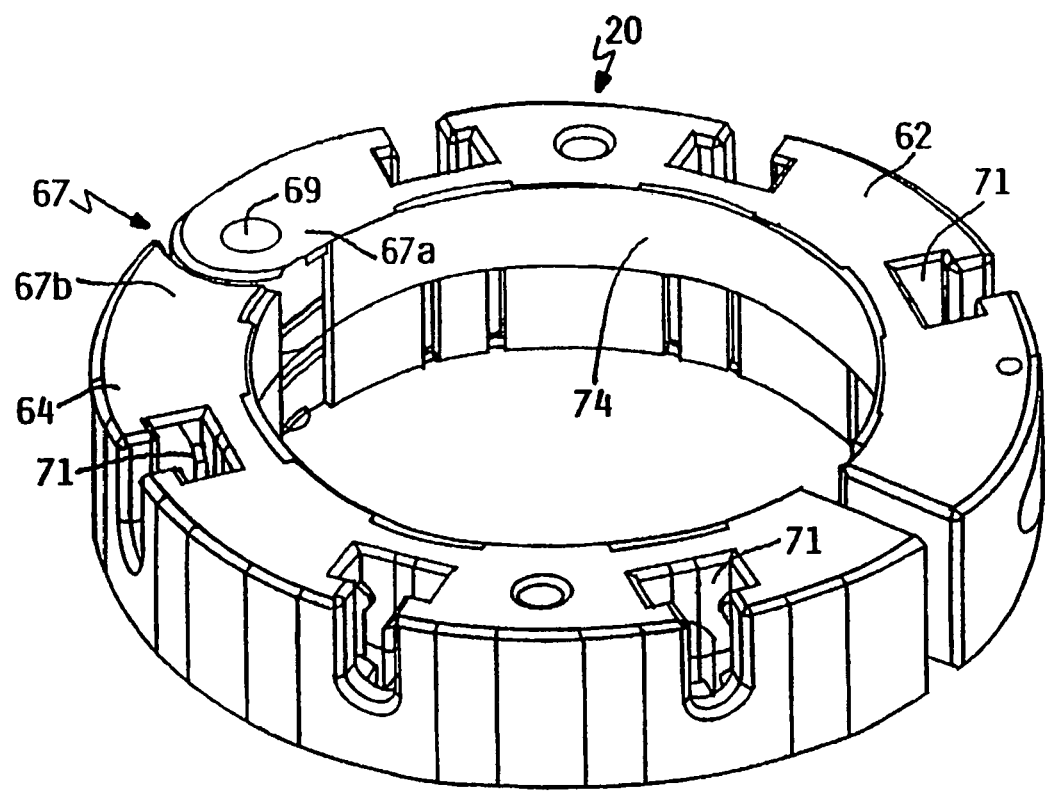
FIG. 32a is a perspective view of a hinged two piece clamp assembly in accordance with an embodiment of the present invention.

Various other embodiments of the clamp assembly 20, with one such embodiment shown in FIG. 32a, will include a hinge device 67, wherein the first clamp 62 includes a first hinge portion 67a and the second clamp 64 includes a second hinge portion 67b. Generally, one of the respective first and second clamp locking channels 66 and locking fasteners 68 are replaced with the hinge 67 and the corresponding hinge portions 67a, 67b. The corresponding hinge portions 67a, 67b are pivotably mateable with a member such a hinge pivot pin 69 therethrough. The hinge 67 provides a pivoting joint connecting the clamps 62, 64 for selective rotational adjustment of the clamps 62, 64 in relation to each other to facilitate placement on and removal of the assembly 20 from the frame members 12. Tab receiving recesses 71 can be included for attaching the inner lining 74, as shown in FIG. 32a. However, other hinged embodiments of the clamp assembly 20 will connect a liner, magnetic member, and the like to the inner circumferential surface 72 of at least one of the clamps 62, 64 using the adhesive or other bonding techniques and methods described herein.

Figure 34:
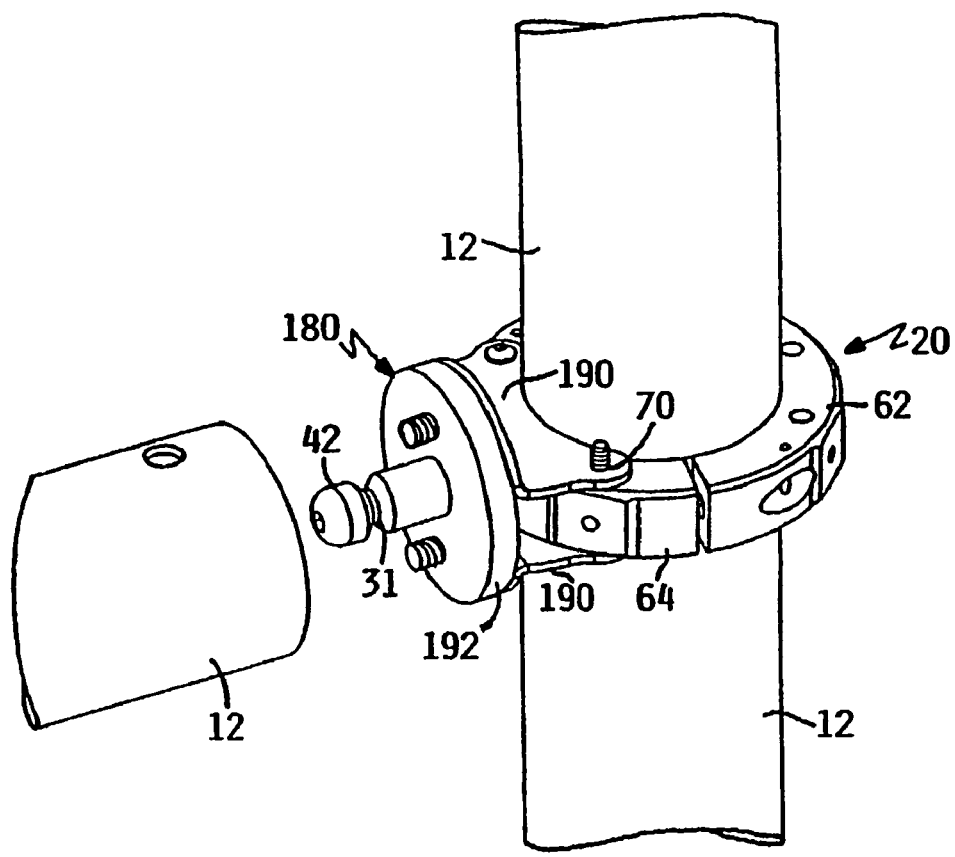
FIG. 34 is a perspective view of the connectivity of a two piece clamp assembly, a collar frame connector assembly, and a tubular frame member in accordance with an embodiment of the present invention.
Figure 35:
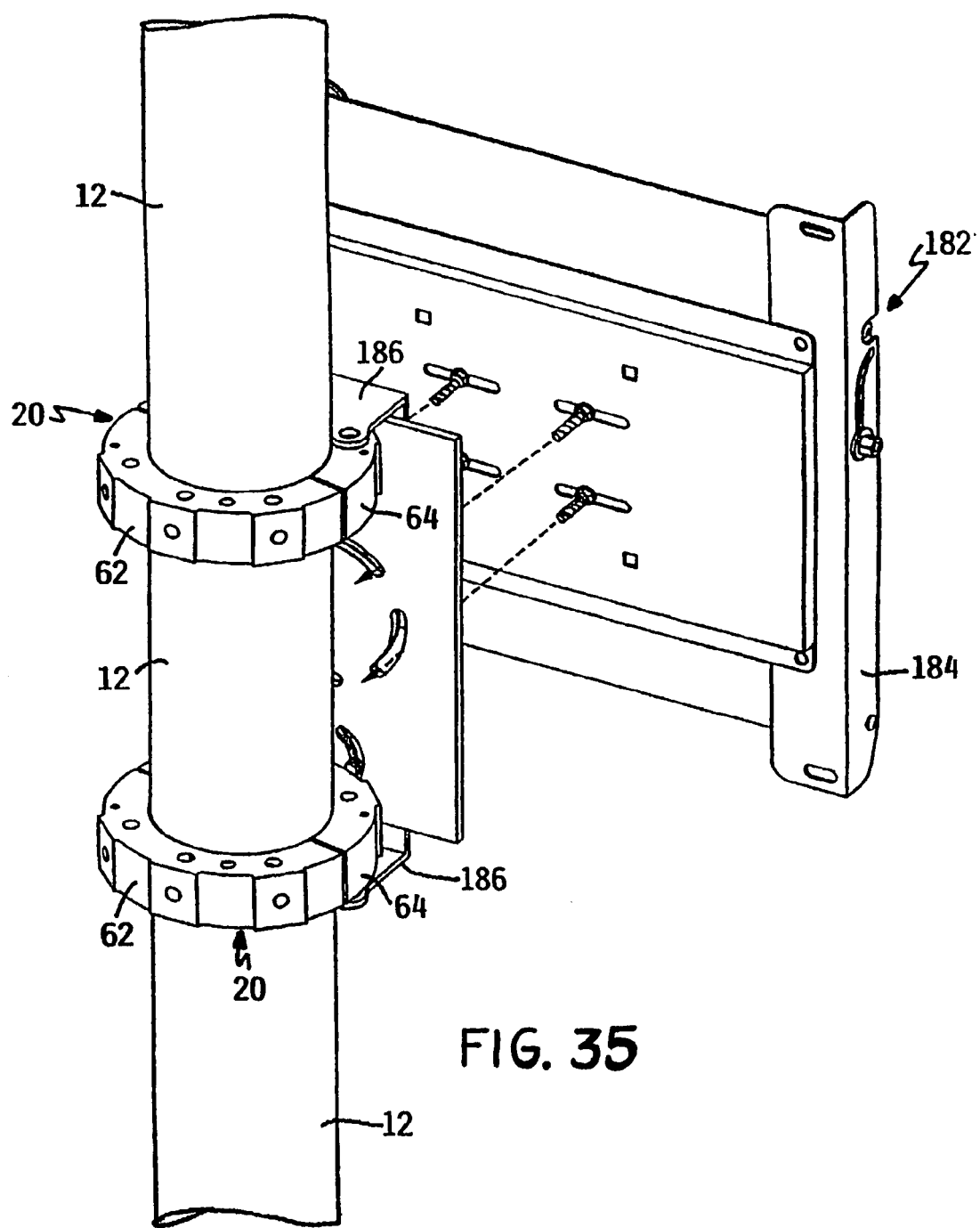
FIG. 35 is a perspective view of the connectivity of two piece clamp assemblies, a display mounting assembly, and a tubular frame member in accordance with an embodiment of the present invention.
Figure 36:
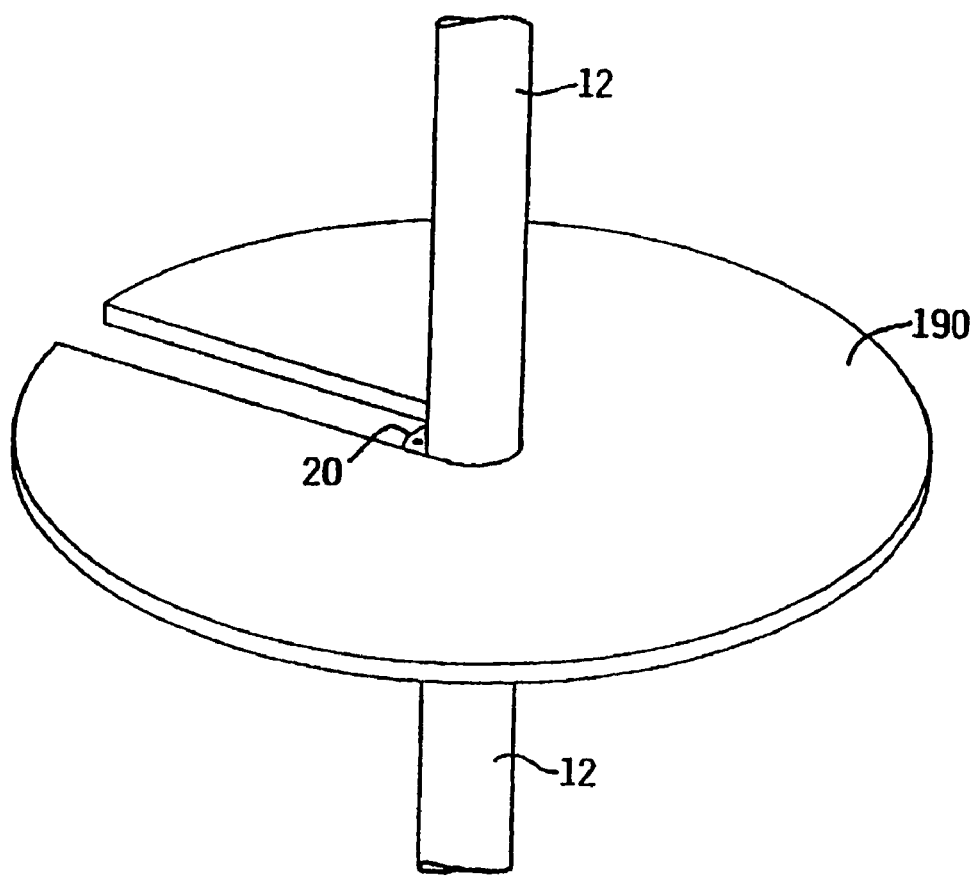
FIG. 36 is a perspective view of a clamp assembly, a counter, and a tubular frame member in accordance with an embodiment of the present invention.

A myriad of frame system attachments arid appurtenances 178 can be secured to the frame members 12 by way of the clamp assembly 20 and the attachment apertures 70, as shown in FIGS. 34–36. For instance appurtenances 178 such as computer monitor support bars, screen attachment tubing and apparatus, lighting, banner connectors, shelves, literature racks, plasma supports, support brackets, CPU cabinets, keyboard tables, counters, and like components and accessories systems can be selectively attached to the attachment apertures 70 of the clamp assembly 20. Referring to FIG. 34, a collar frame connector assembly 180 is shown. The collar assembly 180 generally includes at least one collar bracket 190 secured to the attachment apertures 70, and a linking assembly 192. The collar assembly 180, and the linking assembly 192 in particular, are adapted to lockably engage the flange 14 of a frame member 12 to provide an additional connectivity option for the present invention.

FIG. 35 shows two clamp assemblies 20 spaced along the length of the frame member 12 to provide support for a display mounting assembly 182, such as those used to support computer displays and plasma screens. The display mounting assembly 182 can include a frame assembly and connecting brackets 186, wherein the brackets 186 are secured to the attachment apertures 70 of the clamp assembly 20. FIG. 36 demonstrates how a clamp assembly 20 can be utilized to secure a counter appurtenance 190 to the framework system at selective locations along the length of a frame member 12. The counter or shelf 190 is positioned to rest upon the clamp assembly 20 and secured into at least one of the clamps 62, 64 through the attachment apertures.

Figure 37:
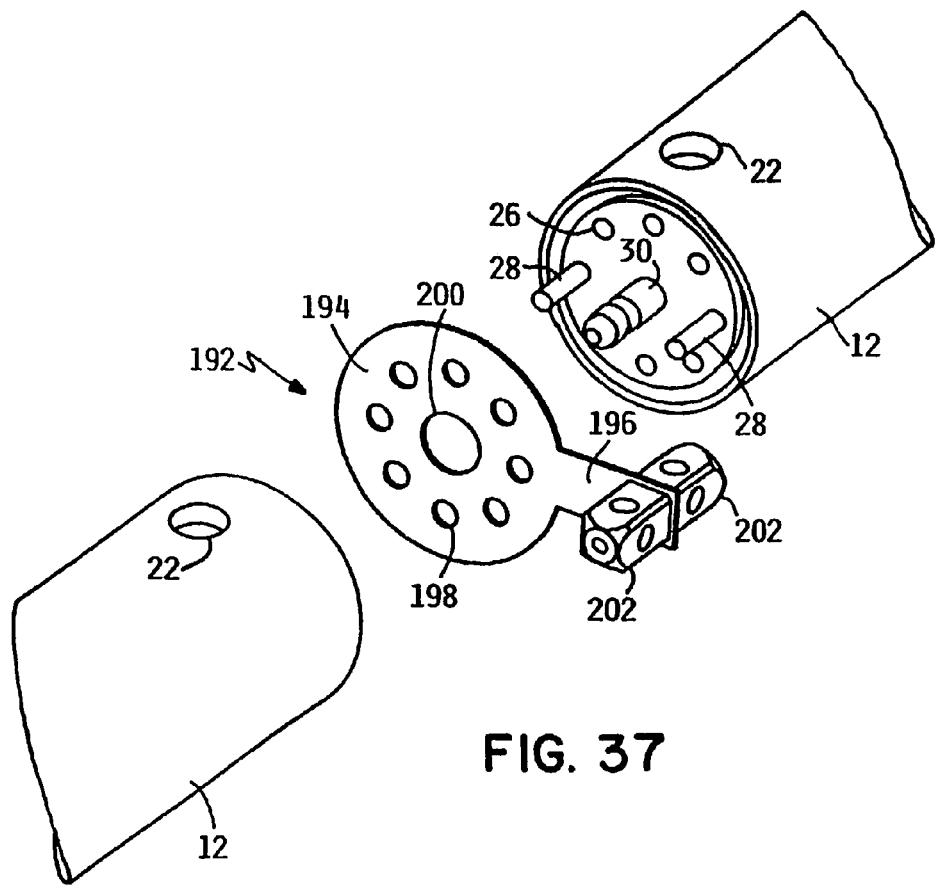
FIG. 37 is a perspective view of the connectivity of a single branch bracket device and tubular frame members in accordance with an embodiment of the present invention.
Figure 38:
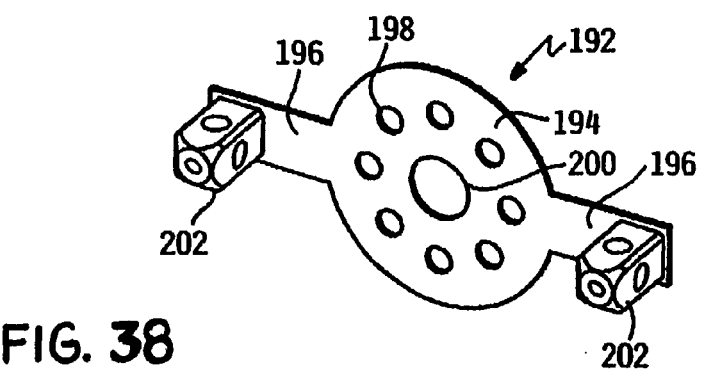
FIG. 38 is a perspective view of a two branch bracket device and connector blocks in accordance with an embodiment of the present invention.

FIGS. 37–38 show a bracket device 192 which can include a central body portion 194, at least one bracket branch 196, bracket indexing apertures 198, and a bracket central aperture 200. Connector blocks 202 can also be included to provide modular connectivity for other tubing members, such as those tubing segments, members, and devices disclosed and taught in U.S. patent application Ser. Nos. 09/953,113 and 09/953,111, which are hereby incorporated by reference in their entirety. Other connectors or small tubing segments can be joined to the bracket device 92 using various connections, such as clips, snaps, tracks, and like connection means without deviating from the spirit and scope of the present invention. The branch 196 can be elongate branches as shown in FIGS. 37–38, or they can take the form of clips or other connectors. In addition, a plurality of branches 196 can be employed, at various angles with respect to the central portion 194 and other branches 196. The central body portion 194 is preferably sized and shaped for intermediate positioning and securement between two frame members 12 and their corresponding flanges 14 with the bracket branch 196 extending some distance out transverse or radial to the axis $a_1$ of the frame members 12. As such, the bracket central aperture 200 and the bracket indexing apertures are adapted to intermediately receive the connector pin 30, 42 and indexing pins 28, respectively, as demonstrated in FIG. 37. Upon securement of the end portions 21 and flanges 14 of the confronting frame members 12, the bracket device 192 is locked into place.

Figure 39:
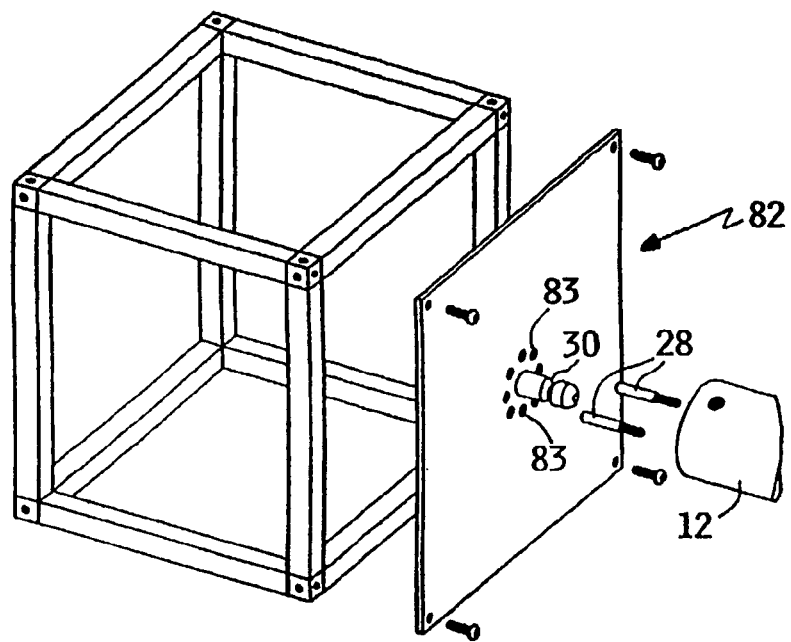
FIG. 39 is a perspective view of the connectivity of a tubular frame member, an end plate, and a display frame in accordance with an embodiment of the present invention.
Figure 40:
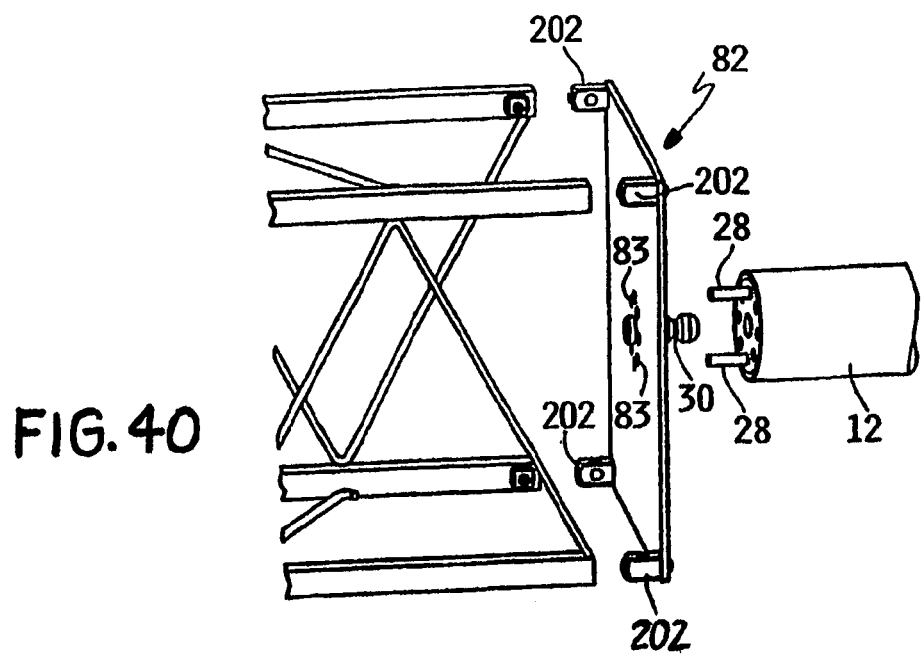
FIG. 40 is a perspective view of the connectivity of a tubular frame member, an end plate, and a display frame in accordance with an embodiment of the present invention.

The system 10 of the present invention can further include various assemblies and connection components adapted to facilitate compatible interconnectivity with other framing systems. For instance, an end plate 82 assembly, as in FIGS. 39–40, having a plurality of receiving apertures or recesses 83 can be included to connection to box frame assemblies such as the system described and disclosed in previously incorporated U.S. patent application Ser. Nos. 09/953,113 and 09/953,111. The receiving apertures 83 can be spaced to match corresponding box frame trusses or other frame members on one side, and aligned for lockable connection with indexing pins 28 and/or the connector pin 42 of the end flanges 14 on the other side. Connectors, such as the connector blocks 202, can be secured to appropriate portions of at least one side of the end plate 82 to facilitate connection to the other frame members. As shown in FIG. 39, and as described herein, the connector pin 30, 42 can be threaded at one end for attachment to the end plate assembly 82. Other embodiments may weld the plate 82 to the frame members 12, or implement a myriad of other attachment techniques and methods. With such a configuration it is possible to join frame systems having very different shapes and structural characteristics, such as the joining of cylindrical tubing framing systems to square tubing box frame systems. Other possible combinations and end plate shapes are envisioned for joining frame systems having different shapes.

Referring primarily to FIGS. 1d–1e, and 21, in use the framework connection system 10 of the present invention provides the end user with a wide variety of angular configuration options using selective combinations of one or more of the end flanges 13, the hub plate assemblies 16, and the hub assemblies 18. The following examples are merely to provide instruction on some of the potential permutations available to the end user, and are not intended to be at all exhaustive.

In one embodiment, the system 10 can be quite simplistic in its configuration by providing for a direct connection of two axially aligned frame members 12. With such a configuration, the connector pin 30 having two substantially identical ends with grooves 31, is inserted into the central apertures 24 of the respective flanges 14 along axis $a_2$, wherein connector fasteners 32 are inserted through the end apertures 22 of the frame members 12 to removably lock the frame members 12 abuttably together. The connector fasteners 32 engage the grooves 31 of respective end portions of connector pin 30 to achieve engagement in one embodiment. The indexing pins 28 can be included within the indexing apertures 26 of abutting flanges 14 to provide rotational stability. A plurality of these frame members 12, straight or curvilinear, can be connected one after the other in series.

In other embodiments, as demonstrated in FIGS. 1d–1e, and 21, the hub plate 33 and corresponding connecting branches 34 are connectable to hub assemblies 18 to further increase the angular configuration options of the system. Generally speaking, a corresponding hub 46 and hub assembly 18 is matched with every connecting branch 34 of the subject hub plate 33 such that the hub plate 33, and the inner portion 35 in particular, interpose the hubs 46. The branches 34 are slidably received in the receiving slots 54 of the hubs 46. In those embodiments wherein the branches 34 are positioned at ninety-degree intervals, this will result in a maximum of four angular options along the plane of the plate 33, for each plate 33 integrated into the system 10. For instance, as shown best in FIGS. 1d, a three-way hub plate assembly 16 can be included, wherein the three hub plate 33 connecting branches 34 are connectable to three transversely aligned respective hub assemblies 18 via the hub receiving slots 52. In turn, the hub assemblies 16, at the end opposite the receiving slots 52, are locked with connector pins 30, 42, and/or aligned with the indexing pins 28, to axially align the hub assemblies 16 with the respective flanges 14 of the frame members 12 along axis $a_1$ and $a_2$. Further, two frame members 12 can be lockably secured to the inner portion 35 of the hub plate 33, transverse to the plane of the plate 33, using the plate connector pins 42, 44. With such a configuration, a five member 12 juncture is created. Alternatively, a filler cap 80 can be inserted to fill in the exposed inner portion 35 of the plate 33.

Similarly, if a four branch 34 hub plate 33 is employed, it is possible to create a six member 12 juncture. Even a rather simple one way branch 34 hub plate assembly 16 can provide for a three member 12 juncture with the attachment of the hub 46 to the one branch 34, and the transverse attachment of two additional members 12 at the inner portion 35 of the plate 33. Moreover, clamp assemblies 20, filler caps 80, end plates 82, corner joints 100, base stands 154, foot pods 162 and other components and assemblies can substitute for, or be incorporated with, the members 12. It should be obvious to one skilled in the art that the removal, addition, and the selective combination of various system components leaves the end user with a multitude of angular, functional, and aesthetic configuration options, of which only a few have been described to merely advance an understanding of the advantages of the present invention. Combining the selective modular configuration of system 10 of the present invention with other appurtenances 178, screens, and components and systems known to one skilled in the art for use with display frameworks are demonstrated in FIGS. 1a–1c.

Although the invention herein has been described by way of examples of preferred and alternative demonstrative embodiments, it will be evident that other adaptations and modifications may be employed without departing from the spirit and scope of the present invention. The terms and expressions employed herein have been used as terms of description and not of limitation. There is no intent to exclude equivalents and selective combinations, and it is intended that the description cover any and all equivalents that may be employed without departing from the spirit and scope of the invention.

The invention claimed is:

1. A portable dissassembleable display comprising a tubular framework that stands upon a floor surface, and a graphic display portion supported by the tubular framework, the tubular framework comprising:

- a plurality of metallic tubular segments each of said plurality of tubular segments being at least two and one-half inches in diameter, said plurality including a first tubular segment and a second tubular segment, each of said first and second tubular segments having two end portions, at least one end portion of the first tubular segment having a first flange portion and at least one end portion of the second tubular segment having a second flange portion at the respective end portions, each of said flange portions having a radially extending set screw and at least one axially extending pin recess, each of the set screws adjustable radially into and out of the respective pin recesses, the first tubular end portion and the first flange portion in axial alignment and a confronting relationship with the second tubular end portion and the second flange portion, and the axially extending pin recess in the first flange portion in alignment with the second axially extending pin recess in the second flange portion; and
- at least one connecting pin having an axis and extending into and between the aligned first and second axially extending pin recesses, the connecting pin having two set screw receiving regions engagable with the respective set screws such that the first and second tubular segments are securable together forming axially aligned conjoined tubular segments.

2. The portable dissassemblable display of claim 1, wherein the connecting pin is axially centered within the first and second flange portions.

3. The portable dissassemblable display of claim 1, wherein the first tubular end portion and the second tubular end portion have a connecting plate sandwiched therebetween, the connecting plate having opposite side surfaces and an aperture extending through the connecting plate with the connecting pin extending through said aperture.

4. The portable dissassemblable display of claim 3, wherein the connecting pin comprises two axially aligned separable connecting pin portions that removably attach together on the opposite sides of the connecting plate through said aperture, thereby securing the connecting plate between the two separable connecting pin portions.

5. The portable dissassemblable display of claim 3, wherein conjoined tubular end portions have a substantially cylindrical outer periphery and wherein the connecting plate has at least one connecting branch extending radially outward beyond the cylindrical outer periphery of the conjoined tubular end portions for attachment of at least one of the set comprising an end portion of a tubular segment and a hub.

6. The portable dissassemblable display of claim 5, wherein the connecting plate is configured as a hub connecting plate and wherein the at least one connecting branch has a first outer surface and an opposite second outer surface, the first outer surface having at least one recess extending into the connecting branch.

7. The portable dissassemblable display of claim 6, wherein the recess in the first outer surface does not extend through to the second outer surface.

8. The portable dissassemblable display of claim 6, further comprising a hub having a contoured side for engagement with the substantially cylindrical outer periphery of at least one of the conjoined tubular end portions, the hub further having a slot for receiving the at least one connecting branch and a securing member for engagement with the recess in the first outer surface of the at least one connecting branch.

9. The portable dissassemblable display of claim 8, wherein the securing member is a setscrew.

10. The portable dissassemblable display of claim 8, wherein the hub further includes a front face portion distal the slot, the front face portion having an axially extending central aperture for receiving a connector pin of a third tubular end portion for connecting a third tubing segment in radial alignment with the conjoined first and second tubular segments.

11. A portable dissassembleable display comprising a tubular framework and a graphic display portion supported by the tubular framework, the display being self-standing upon a floor surface, the display comprising:

- a plurality of tubular segments, said plurality of tubular segments being at least two and one/half inches in diameter and including a first tubular segment and a second tubular segment, each of said first and second tubular segments having two end portions, the tubular end portions removably conjoined with a hub connecting plate sandwiched therebetween, the hub connecting plate having at least one outwardly extending connecting branch having a recess,
- a hub having a contoured side for engagement with the substantially cylindrical outer periphery of the conjoined tubular end portions, the hub further having a slot for receiving the at least one connecting branch and a securing member for engagement with the recess of the at least one connecting branch;
- at least one end portion of the first tubular segment having a first flange portion and at least one end portion of the second tubular segment having a second flange portion, each of said flange portions having a radially extending securing aperture and a set screw and at least one axially extending pin recess, each of the set screws adjustable radially into and out of the respective securing apertures;
- wherein the first tubular end portion and the first flange portion are in axial alignment and a confronting relationship with the second tubular end portion and the second flange portion, and the axially extending pin recess in the first flange portion is in alignment with the second axially extending pin recess in the second flange portion; and
- at least one connecting pin having an axis and extending between and into the aligned first and second axially extending pin recesses, the connecting pin having two set screw receiving regions engagable with respective set screws whereby the first and second tubular segments are secured together forming axially conjoined tubular end portions.

12. A display constructed from a framework connecting system, the framework connection system comprising:

- a first tubular frame member having two first member end portions having end portion apertures, and at least one first member flange secured within at least one of the first member end portions, the first member flange having at least one axially traversing connection aperture and a radially traversing securing aperture in communication with the respective end portion aperture;
- a second tubular frame member having two second member end portions having end portion apertures, and at least one second member flange secured within at least one of the second member end portions, the second member flange having at least one axially traversing connection aperture and a radially traversing securing aperture in communication with the respective end portion aperture; and a connector pin having two pin end portions, wherein one of the pin end portions extends into the axially traversing connection aperture of the first member flange and the other of the pin end portions extends into the axially traversing connection aperture of the second member flange, and wherein the first and second tubular frame members are abuttably conjoined at the respective end portions and the connector pin end portions are secured in place by securing members inserted through the radially traversing securing apertures of the first and second member flanges.

13. The framework connection system of claim 12, wherein the securing members are set screws.

14. The framework connection system of claim 13, wherein at least one of the two pin end portions of the connector pin includes a radial groove adapted to engageably receive the securing member.

15. The framework connection system of claim 12, wherein the first member flange and the second member flange further include at least one axially extending indexing aperture and at least one indexing pin such that insertion of the at least one indexing pin in the at least one axially extending indexing aperture of each of the member flanges of the conjoined tubular frame members provides rotation stability.

16. The framework connection system of claim 12, further including a hub plate interposed between the conjoined first and second tubular frame members, the hub plate having a central plate portion, a central portion aperture, and at least one connecting branch having a branch recess and extending outward from the central plate portion.

17. The framework connection system of claim 16, further comprising a hub having a securing member, a radial engagement aperture, and a branch receiving slot and a central hub aperture both extending axially into the hub and in communication with the radial engagement aperture, wherein the branch receiving slot slidably receives the at least one connecting branch and the securing member is adapted to securably engage the branch recess.

18. The framework connection system of claim 17, wherein the hub further includes a connector pin, and the framework connection system further comprising a third tubular frame member and a third member flange secured within at least one end portion of the third frame member and having at least one axially traversing connection aperture such that the connector pin is secured within the axially traversing connection aperture of the third member flange and the central hub aperture of the hub to conjoin the hub and third tubular frame member whereby the third tubular frame member extends radially in relation to the axially conjoined first and second tubular frame members.

19. The framework connection system of claim 18, wherein at least one of the first, second and third tubular frame members is curvilinear.

20. The framework connection system of claim 12, wherein at least one of the end portions of at least one of the first and second tubular frame members is adapted to securely axially receive an end cap.

21. The framework connection system of claim 12, wherein at least one of the end portions of at least one of the first and second tubular frame members is adapted to securely axially receive a base stand to provide standing floor support for the display.

22. The framework connection system of claim 21, wherein the base stand is a foot pod having a threaded axial shaft and an elongate nut adjustable along at least a portion of the length of the shaft to provide height adjustment for the foot pod.

23. The framework connection system of claim 22, wherein the foot pod further includes a ball joint therein to provide angular adjustment of the portion of the display being supported by the foot pod.

24. A display constructed from a framework connection system, the framework connection system comprising:

at least a first tubular frame member and a second tubular frame member, each of the tubular frame members having a first end portion and a second end portion, and an end portion aperture radially traversing into at least one of the first and second end portions, the first and second tubular frame members further having a flange securely attached and axially aligned within at least one of the first and second end portions, the flange having at least one axially traversing aperture, and a radially traversing aperture in communication with the at least one end portion aperture;

at least one hub plate having a central portion, at least one connecting branch extending out from the central portion, and a pin receiving aperture extending through the central portion;

at least one connector pin extending through the central portion of the hub plate such that a first end and a second end of the connector pin are extending out from and transverse to the plane of the central portion and the at least one connecting branch; and wherein the first tubular frame member and the second tubular frame member are axially conjoined at respective end portions with the hub plate interposed therebetween and the first end of the connector pin extending into the axially traversing aperture of the flange of the first tubular frame member and the second end of the connector pin extending into the axially traversing aperture of the flange of the second tubular frame member, the ends of the connector pin being securely engaged through the respective tubular frame member end portion aperture.

25. The framework connection system of claim 24, further comprising a hub having a securing member, a radial engagement aperture, and a branch receiving slot and a central hub aperture both extending axially into the hub and in communication with the radial engagement aperture, wherein the branch receiving slot slidably receives the at least one connecting branch and the securing member is adapted to securely engage the at least one connecting branch.

26. The framework connection system of claim 25, wherein the hub further includes a connector pin, and the framework connection system further comprises a third tubular frame member and a third member flange secured within at least one end portion of the third frame member and having at least one axially traversing connection aperture such that the connector pin is secured within the axially traversing connection aperture of the third member flange and the central hub aperture of the hub to conjoin the hub and third tubular frame member whereby the third tubular frame member extends radially in relation to the axis of conjoined first and second tubular frame members.

27. A system for constructing and assembling and disassembling a floor display according to a selectively modular configuration, the system comprising:

a plurality of tubular frame segments, each with two end portions having a bore extending axially therein and an outer circumferential surface;

a plurality of connecting flanges, each adapted for axial alignable securement within the end portions of the tubular frame segments within the axial bore;

a plurality of connecting plates, each adapted to confrontingly secure between the connecting flanges of axial aligned tubular frame segments and having at least one outwardly extending connecting branch;

a plurality of hubs, each adapted to slidably engage the at least one connecting branch of the connecting plates and to engage the connecting flanges to provide for tubular frame segment connectivity; and wherein the plurality of tubular frame segments, the plurality of connecting flanges, the plurality of connecting plates, and the plurality of hubs create an assembleable framework of the floor display for supporting graphical displays and appurtenances.

28. The system of claim 27, further including at least one fixed angle corner device having a base portion extending along a first axis, and a fixed angle portion extending along a second axis different than the axis of the base portion, the base and fixed angle portions adapted for axial attachment to tubular frame segments at respective connecting flanges such that one of the tubular frame segments extends along the first axis and another of the tubular frame segments extends along the second axis.

29. The system of claim 28, wherein the first axis and second axis are substantially ninety-degrees in relation to each other.

30. The system of claim 27, further including at least one pivotable angle corner device having a base portion extending along a first axis, and a pivotable angle portion having a pivot pin connecting the base portion and the pivotable angle portion, wherein the pivotable angle portion is angularly adjustable in relation to the base portion at the pivot pin to extend along a variable second axis, the base and pivotable angle portions adapted for axial attachment to tubular frame segments at respective connecting flanges such that one of the tubular frame segments extends along the first axis and another of the tubular frame segments extends along the variable second axis.

31. The system of claim 30, wherein the base portion includes at least one first indexing aperture and at least one first indexing pin having two end portions, and the pivotable angle portion includes at least one second indexing aperture, the first indexing pin adapted to removably engage at one end the first indexing aperture, and at the other end the second indexing aperture to lock the pivotable angle portion at a plurality of predefined axis for the variable second axis.

32. A method of constructing a display from a tubular framework connection system, comprising the steps of:

providing a first tubular frame segment having at least one first end portion including a radially extending securing aperture and an axially connected flange having at least one axial connector aperture;

providing a second tubular frame segment having at least one second end portion including a radially extending securing aperture and an axially connected flange having at least one axial connector aperture;

providing a connector pin having distal engagement grooves, the connector pin being disposed to extend between and into the axial connector apertures of the flanges of the first and second tubular frame segments such that one of the engagement grooves is aligned with the radially extending securing aperture of the first tubular frame segment and the other of the engagement grooves is aligned with the radially extending securing aperture of the second tubular frame segment; and engaging a securing member through each of the radially extending securing apertures of the first and second frame segments for engagement with the respective engagement grooves of the connector pin to confrontingly axially conjoin the first and second frame segments.

33. A method of constructing a display from a tubular framework connection system, comprising the steps of:

providing a first tubular frame segment having at least one first end portion including a radially extending securing aperture and an axially connected flange having at least one axial connector aperture;

providing a second tubular frame segment having at least one second end portion including a radially extending securing aperture and an axially connected flange having at least one axial connector aperture, the second tubular frame segment being axially aligned with the first tubular frame segment;

providing a third tubular frame segment having at least one third end portion including a radially extending securing aperture and an axially connected flange having at least one axial connector aperture;

disposing a connector plate having at least one connecting aperture and at least one outwardly extending connecting branch between the axially aligned first and second tubular frame segments;

providing a connector pin having distal engagement grooves, the connector pin being disposed to extend between and into the axial connector apertures of the flanges of the first and second tubular frame segments and through the at least one connecting aperture of the connector plate such that one of the engagement grooves is aligned with the radially extending securing aperture of the first tubular frame segment and the other of the engagement grooves is aligned with the radially extending securing aperture of the second tubular frame segment;

engaging a securing member through each of the radially extending securing apertures of the first and second frame segments for engagement with the respective engagement grooves of the connector pin to confrontingly axially conjoin the first and second frame segments;

slidably engaging a receiving slot of a hub onto the at least one connecting branch of the connector plate; and coupling the flange of the third tubular frame segment to the hub by securing one end of a hub connector pin through a receiving aperture of the hub and the other end of the hub connector pin through the axial connector aperture of the flange of the third tubular frame segment such that the third tubular frame segment extends transverse to the axially conjoined first and second frame segments.

34. An appurtenance connection system for connecting appurtenances to a tubular display framework, comprising:

at least one tubular frame segment having a circumferential outer surface and two end portions;

a first c-shaped clamp portion and a second c-shaped clamp portion joinable to form a cylindrical clamping device, each of the c-shaped clamp portions having a top surface, a bottom surface, an outer diametrical surface, and an inner diametrical surface, wherein at least one of the surfaces of at least one of the c-shaped clamp portions includes a plurality of attachment apertures therein for connecting appurtenances to the cylindrical clamping device; and wherein the inner diametrical surfaces of the first and second c-shaped clamp portions are shroudably alignably engaged around the circumferential outer surface of the at least one tubular frame segment intermediate the two end portions and joined to form the cylindrical clamping device.

35. The appurtenance connection system of claim 34, wherein the first c-shaped clamp portion and the second c-shaped clamp portion are joined at a hinge device to provide selective rotational adjustment of said clamp portions of the cylindrical clamping device.

36. The appurtenance connection system of claim 34, wherein the inner diametrical surface of at least one of the c-shaped clamp portions includes a magnetic member to facilitate engagement with the circumferential outer surface of the at least one tubular frame segment.

37. The appurtenance connection system of claim 34, wherein the outer diametrical surface of at least one of the c-shaped clamp portions includes a plurality of spaced surface flats having the attachment apertures for connecting appurtenances to the cylindrical clamping device.

38. The appurtenance connection system of claim 37, wherein the top surface and the outer diametrical surface further include the attachment apertures for connecting appurtenances to the cylindrical clamping device.

39. The appurtenance connection system of claim 34, wherein an appurtenance connectable to at least one of the attachment apertures of the cylindrical clamping device is selected from a group consisting of: a lighting device, a shelf, a table, a computer housing box, and a computer display screen.

40. The appurtenance connection system of claim 34, further including a tubing connection collar having a circular body portion and a collar aperture extending through the circular body portion, the tubing connection collar being coupled to the cylindrical clamping device at one of the attachment apertures;

a second tubing segment having two end portions and a flange axially secured to one of the end portions, the flange having an axially extending connecting aperture therein; and a connector pin having two pin end portions, whereby one of the two pin end portions is removably connected into the collar aperture and the other of the two pin end portions is removably connected into the axially extending connecting aperture of the flange of the second tubing segment such that the second tubing segment is joined with the cylindrical clamping device in a transverse relationship to the first tubing segment.

41. A display constructed from a framework connecting system, the framework connection system composing:

a first tubular frame member having two first member end portions having end portion apertures, and a first flange insertably axially secured within at least one of the first member end portions;

a second tubular frame member having two second member end portions having end portion apertures, and a second flange insertably axially secured within at least one of the second member end portions;

means for conjoining the first flange and the second flange such that the respective first member and second member end portions are axially conjoined; and means for lockably securing the means for conjoining the first flange and the second flange through the respective end portion apertures of the first member and second member end portions.

42. The framework connecting system of claim 41, further comprising a hub plate interposed between the conjoined first and second flanges, the hub plate having at least one means for axially conjoining the hub plate between the first and second flanges and at least one means for receivably securing a hub to the hub plate.

43. The framework connecting system of claim 41, further including means for limiting axial rotational movement of the respective first and second member end portions around the means for conjoining the first flange and the second flange.

44. The framework connecting system of claim 42, further including a third tubular frame member having two third member end portions having end portion apertures, and a third flange insertably axially secured within at least one of the third member end portions.

45. The framework connecting system of claim 44, further including means for axially conjoining the third flange to the hub distal the means for receivably securing the hub to the hub plate.

* * * * *

UNITED STATES PATENT AND TRADEMARK OFFICE
CERTIFICATE OF CORRECTION

| | | |
|---|---|---|
| PATENT NO. | : 7,024,834 B2 | |
| APPLICATION NO. | : 10/601843 | |
| DATED | : April 11, 2006 | |
| INVENTOR(S) | : Dixon S. Gimpel and Curtis H. Lindblom | |

It is certified that error appears in the above-identified patent and that said Letters Patent is hereby corrected as shown below:

Col. 7, line 19, delete "mail" and insert --male--

Col. 10, line 14, delete the "," after "the"

Col. 12, line 27, delete the "." after the second occurrence of "the"

Col. 12, line 30, delete "arid" and insert --and--

Col. 14, line 66, cancel the text beginning with "1. A portable dissassembleable display comprising" to and ending "aligned conjoined tubular segments." in Col. 15, line 28, and insert the following claim:

1. A portable dissassembleable display comprising a tubular framework that stands upon a floor surface, and a graphic display portion supported by the tubular framework, the tubular framework comprising:
- a plurality of metallic tubular segments each of said plurality of tubular segments being at least two and one-half inches in diameter, said plurality including a first tubular segment and a second tubular segment, each of said first and second tubular segments having two end portions, at least one end portion of the first tubular segment having a first flange portion disposed therein, and at least one end portion of the second tubular segment having a second flange portion disposed therein, each of said flange portions having a radially extending aperture, a radially extension set screw, a central axially extending pin recess, and a plurality of indexing pin recesses positioned around the central pin recess to form a generally circular indexing pin recess formation, the set screws adjustable into and out of the radially extending aperture and the central pin recess of the respective flange portion, the first tubular end portion and the first flange portion in axial alignment and a confronting relationship with the second tubular end portion and the second flange portion, and the central axially extending pin recesses of the first flange portion in alignment with the central axially extending pin recess of the second flange portion; and
- at least one connecting pin having an axis and extending into and between the aligned axially extending pin recesses, the connecting pin having two set screw receiving regions engagable with the respective set screws such that the first and second tubular segments are securable together forming axially aligned conjoined tubular segments.

UNITED STATES PATENT AND TRADEMARK OFFICE
CERTIFICATE OF CORRECTION

| | |
|---|---|
| PATENT NO. | : 7,024,834 B2 |
| APPLICATION NO. | : 10/601843 |
| DATED | : April 11, 2006 |
| INVENTOR(S) | : Dixon S. Gimpel and Curtis H. Lindblom |

It is certified that error appears in the above-identified patent and that said Letters Patent is hereby corrected as shown below:

Col. 15, line 57, cancel the text beginning with "7. The portable dissassemblable display of claim 6," to and ending "second outer surface" in Col. 15, line 59, and insert the following claim:

--7. The portable dissassemblable display of Claim 6, wherein the at least one recess in the first outer surface does not extend through to the second outer surface.--

Col. 15, line 60, cancel the text beginning with "8. The portable dissassemblable display of claim 6," to and ending "branch" in Col. 15, line 67, and insert the following claim:

--8. The portable dissassemblable display of Claim 6, further comprising a hub having a contoured side for engagement with the substantially cylindrical outer periphery of at least one of the conjoined tubular end portions, the hub further having a slot for receiving the at least one connecting branch and a securing member for engagement with the at least one recess in the first outer surface of the at least one connecting branch.--

Col. 16, line 1, cancel the text beginning with "9. The portable dissassemblable display of claim 8," to and ending "is a setscrew.", in Col. 16, line 2, and insert the following claim:

--9. The portable dissassemblable display of Claim 8, wherein the securing member is a set screw.--

Col. 16, line 10, cancel the text beginning with "11. A portable dissassemblable display comprising a," to and ending "tubular end portions", in Col. 16, line 52, and insert the following claim:

--11. A portable dissassemblable display comprising a tubular framework and a graphic display portion supported by the tubular framework, the display being self-standing upon a floor surface, the display comprising:
    a plurality of tubular segments, said plurality of tubular segments being at least two and one/half inches in diameter and including a first tubular segment and a second tubular segment, each of said first and second tubular segments having two end portions, the tubular end portions removably conjoined with a hub connecting plate sandwiched therebetween, the hub connecting plate having at least one outwardly extending connecting branch having a recess;

UNITED STATES PATENT AND TRADEMARK OFFICE
CERTIFICATE OF CORRECTION

| | |
|---|---|
| PATENT NO. | : 7,024,834 B2 |
| APPLICATION NO. | : 10/601843 |
| DATED | : April 11, 2006 |
| INVENTOR(S) | : Dixon S. Gimpel and Curtis H. Lindblom |

It is certified that error appears in the above-identified patent and that said Letters Patent is hereby corrected as shown below:

a hub having a contoured side for engagement with the substantially cylindrical outer periphery of the conjoined tubular end portions, the hub further having a slot for receiving the at least one connecting branch and a securing member for engagement with the recess of the at least one connecting branch;

at least one end portion of the first tubular segment having a first flange portion and at least one end portion of the second tubular segment having a second flange portion, each of said flange portions having a radially extending securing aperture and a set screw and at least one axially extending pin recess, each of the set screws adjustable radially into and out of the respective securing apertures;

wherein the first tubular end portion and the first flange portion are in axial alignment and a confronting relationship with the second tubular end portion and the second flange portion, and the axially extending pin recess in the first flange portion is in alignment with the second axially extending pin recess in the second flange portion; and at least one connecting pin having an axis and extending between and into the aligned first and second axially extending pin recesses, the connecting pin having two set screw receiving regions engagable with respective set screws whereby the first and second tubular segments are secured together forming axially conjoined tubular end portions.

Col. 16, line 53, cancel the text beginning with "12. A display constructed from a framework connecting," to and ending "second member flanges", in Col. 17, line 14, and insert the following claim:

--12. A display constructed from a framework connecting system, the framework connection system comprising:

a first tubular frame member having two first member end portions having end portion apertures, and at least one first member flange secured within at least one of the first member end portions, the first member flange having at least one axially traversing connection aperture, a radially traversing securing aperture in communication with the respective end portion aperture of the first tubular frame member and the axially traversing connection aperture of the first member flange, and a plurality of first indexing pin apertures positioned around the at least one axially traversing connection aperture of the first member flange in a generally circular formation;

UNITED STATES PATENT AND TRADEMARK OFFICE
CERTIFICATE OF CORRECTION

| | | |
|---|---|---|
| PATENT NO. | : 7,024,834 B2 | Page 4 of 8 |
| APPLICATION NO. | : 10/601843 | |
| DATED | : April 11, 2006 | |
| INVENTOR(S) | : Dixon S. Gimpel and Curtis H. Lindblom | |

It is certified that error appears in the above-identified patent and that said Letters Patent is hereby corrected as shown below:

a second tubular frame member having two second member end portions having end portion apertures, and at least one second member flange secured within at least one of the second member end portions, the second member flange having at least one axially traversing connection aperture and a radially traversing securing aperture in communication with the respective end portion aperture of the second tubular frame member and the axially traversing connection aperture of the second member flange, and a plurality of second indexing pin apertures positioned around the at least one axially traversing connection aperture of the second member flange in a generally circular formation; and a connector pin having two pin end portions, wherein one of the pin end portions extends into the axially traversing connection aperture of the first member flange and the other of the pin end portions extends into the axially traversing connection aperture of the second member flange, and wherein the first and second tubular frame members are abuttably conjoined at the respective end portions and the connector pin end portions are secured in place by securing members inserted through the radially traversing securing apertures of the first and second member flanges.

Col. 14, line 17, cancel the text beginning with "14. The framework connection system of claim 13," to and ending with "the securing member" in Col. 14, line 20, and insert the following claim:

14. The framework connection system of Claim 12, wherein at least one of the two pin end portions of the connector pin includes a radial groove adapted to engageably receive the securing member.

Col. 14, line 21, cancel the text beginning with "15. The framework connection system of claim 12," to and ending with "stability." in Col. 17, line 28, and insert the following claim:

--15. The framework connection system of Claim 12, further including at least one indexing pin for insertion into the first or second indexing apertures to provide rotation stability for the conjoined first and second tubular frame members.

Col. 18, line 1, cancel the text beginning with "22. The framework connection system of claim 21," to and ending with "foot pod" in Col. 18, line 5, and insert the following claim:

UNITED STATES PATENT AND TRADEMARK OFFICE
CERTIFICATE OF CORRECTION

| | |
|---|---|
| PATENT NO. | : 7,024,834 B2 |
| APPLICATION NO. | : 10/601843 |
| DATED | : April 11, 2006 |
| INVENTOR(S) | : Dixon S. Gimpel and Curtis H. Lindblom |

It is certified that error appears in the above-identified patent and that said Letters Patent is hereby corrected as shown below:

--26. The framework connection system of Claim 21, wherein the base stand includes a foot pod having a threaded axial shaft and an elongate nut adjustable along at least a portion of the length of the shaft to provide height adjustment for the foot pod.--

Col. 19, line 20, cancel the text beginning with "28. The system of claim 27, further including at least one", to and ending with "for the variable second axis.", in Col. 19, line 51.

Col. 19, line 52, cancel the text beginning with "32. A method of constructing a display from a tubular" to and ending with "segments", in Col. 20, line 9, and insert the following claim:

--29. A method of constructing a display from a tubular framework connection system, comprising the steps of:
    providing a first tubular frame segment having at least one first end portion including a radially extending securing aperture and an axially connected first flange having at least one axial connector aperture, a radial connector aperture in generally transverse communication with the at least one axial connector aperture of the first flange, and a plurality of first indexing pin apertures positioned around the at least one axial connector aperture of the first flange in a generally circular formation;
    providing a second tubular frame segment having at least one second end portion including a radially extending securing aperture and an axially connected second flange having at least one axial connector aperture, a radial connector aperture in generally transverse communication with the at least one axial connector aperture of the first flange, and a plurality of first indexing pin apertures positioned around the at least one axial connector aperture of the first flange in a generally circular formation;
    providing a connector pin having distal engagement grooves, the connector pin being disposed to extend between and into the axial connector apertures of the flanges of the first and second tubular frame segments such that one of the engagement grooves is aligned with the radially extending securing aperture of the first tubular frame segment and the radial connector aperture of the first flange, and the other of the engagement grooves is aligned with the radially extending securing aperture of the second tubular frame segment and the radial connector aperture of the second flange; and

UNITED STATES PATENT AND TRADEMARK OFFICE
CERTIFICATE OF CORRECTION

| | | |
|---|---|---|
| PATENT NO. | : 7,024,834 B2 | Page 6 of 8 |
| APPLICATION NO. | : 10/601843 | |
| DATED | : April 11, 2006 | |
| INVENTOR(S) | : Dixon S. Gimpel and Curtis H. Lindblom | |

It is certified that error appears in the above-identified patent and that said Letters Patent is hereby corrected as shown below:

engaging a securing member through each of the radially extending securing apertures of the first and second frame segments and the radial connector apertures of the first and second flanges for engagement with the respective engagement grooves of the connector pin to confrontingly axially conjoin the first and second frame segments.--

Col. 20, line 57, cancel the text beginning with "An appurtenance connection system for connecting", to and ending with "first tubing segment.", in Col. 22, line 6.

Col. 22, line 7, cancel the text beginning with "A display constructed from a framework connecting", to and ending with "member end portions.", in Col. 22, line 23, and insert the following claim:

--30. A display constructed from a framework connecting system, the framework connection system comprising:

a first tubular frame member having two first member end portions having end portion apertures, and a first flange insertably axially secured within at least one of the first member end portions, the first flange having at least one first axial aperture, a radial aperture extending therein for generally transverse communication with the first axial aperture, and a plurality of first indexing pin apertures positioned around the first axial aperture to define a generally circular formation;

a second tubular frame member having two second member end portions having end portion apertures, and a second flange insertably axially secured within at least one of the second member end portions, the second flange having at least one second axial aperture, a radial aperture extending therein for generally transverse communication with the second axial aperture, and a plurality of second indexing pin apertures positioned around the second axial aperture to define a generally circular formation;

means for conjoining the first flange and the second flange such that the respective first member and second member end portions are axially conjoined; and means for lockably securing the means for conjoining the first flange and the second flange through the respective end portion apertures of the first member and second member end portions.--

UNITED STATES PATENT AND TRADEMARK OFFICE
CERTIFICATE OF CORRECTION

| | |
|---|---|
| PATENT NO. | : 7,024,834 B2 |
| APPLICATION NO. | : 10/601843 |
| DATED | : April 11, 2006 |
| INVENTOR(S) | : Dixon S. Gimpel and Curtis H. Lindblom |

It is certified that error appears in the above-identified patent and that said Letters Patent is hereby corrected as shown below:

Col. 22, line 25, cancel the text beginning with "42. The framework connecting system of claim 41, further", to and ending with "to the hub plate", in Col. 22, line 30, and insert the following claim:

--31. The framework connecting system of Claim 30, further comprising a hub plate interposed between the conjoined first and second flanges, the hub plate having at least one means for axially conjoining the hub plate between the first and second flanges and at least one means for receivably securing a hub to the hub plate.--

Col. 22, line 31, cancel the text beginning with "43. The framework connecting system of claim 41, further", to and ending with "flange.", in Col. 22, line 35.

Col. 22, line 36, cancel the text beginning with "44. The framework connecting system of claim 42, further", to and ending with "member end portions.", in Col. 22, line 40, and insert the following claim:

--32. The framework connecting system of Claim 31, further including a third tubular frame member having two third member end portions having end portion apertures, and a third flange insertably axially secured within at least one of the third member end portions, the third flange having at least one third axial aperture and a radial aperture extending therein for generally transverse communication with the third axial aperture.--

UNITED STATES PATENT AND TRADEMARK OFFICE
CERTIFICATE OF CORRECTION

| | | |
|---|---|---|
| PATENT NO. | : 7,024,834 B2 | Page 8 of 8 |
| APPLICATION NO. | : 10/601843 | |
| DATED | : April 11, 2006 | |
| INVENTOR(S) | : Dixon S. Gimpel and Curtis H. Lindblom | |

It is certified that error appears in the above-identified patent and that said Letters Patent is hereby corrected as shown below:

Col. 22, line 41, cancel the text beginning with "45. The framework connecting system of claim 44, further", to and ending with "hub plate.", in Col. 22, line 44, and insert the following claim:

--33. The framework connecting system of Claim 32, further including means for axially conjoining the third flange to the hub distal the means for receivably securing the hub to the hub plate.--

Signed and Sealed this

Twenty-fourth Day of February, 2009

JOHN DOLL
*Acting Director of the United States Patent and Trademark Office*